(12) United States Patent
Taherzadehboroujeni et al.

(10) Patent No.: US 8,588,326 B2
(45) Date of Patent: Nov. 19, 2013

(54) SYSTEM AND METHOD FOR MAPPING SYMBOLS FOR MIMO TRANSMISSION

(75) Inventors: Mahmoud Taherzadehboroujeni, Kitchener (CA); Hosein Nikopourdeilami, Ottawa (CA); Amir Keyvan Khandani, Kitchener (CA); Wen Tong, Ottawa (CA); Ming Jia, Ottawa (CA); Peiying Zhu, Kanata (CA); Dong-Sheng Yu, Ottawa (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 1030 days.

(21) Appl. No.: 11/631,842

(22) PCT Filed: Jul. 7, 2005

(86) PCT No.: PCT/CA2005/001057
§ 371 (c)(1),
(2), (4) Date: Jan. 7, 2008

(87) PCT Pub. No.: WO2006/002550
PCT Pub. Date: Jan. 12, 2006

(65) Prior Publication Data
US 2009/0003466 A1    Jan. 1, 2009

Related U.S. Application Data

(60) Provisional application No. 60/585,583, filed on Jul. 7, 2004, provisional application No. 60/601,178, filed on Aug. 13, 2004.

(51) Int. Cl.
*H04B 7/24* (2006.01)
*H04B 7/00* (2006.01)
*H04L 27/00* (2006.01)
*H04L 27/04* (2006.01)

(52) U.S. Cl.
USPC ........... 375/295; 375/300; 375/308; 370/344; 370/347; 455/39; 455/702

(58) Field of Classification Search
USPC .......... 375/219, 222, 240.24, 240.26–240.27, 375/262, 265, 284, 285, 259, 295, 316, 300, 375/308, 309; 370/464, 482, 481, 526, 310, 370/319, 344, 347, 321; 455/39, 500, 702
See application file for complete search history.

(56) References Cited

U.S. PATENT DOCUMENTS 6,473,467 B1 *  10/2002  Wallace et al. ............... 375/267
7,408,976 B1 *  8/2008   Narasimhan et al. ......... 375/148
(Continued)

FOREIGN PATENT DOCUMENTS

WO      WO 01/76094      11/2001

OTHER PUBLICATIONS

Gesbert et al. "From Theory to Practice: An Overview of MIMO Space-Time Coded Wireless Systems" IEEE Journal on Selected Areas in Communications, vol. 21, No. 3, Apr. 2003, pp. 281-302.

*Primary Examiner* — Sam K Ahn
*Assistant Examiner* — Linda Wong
(74) *Attorney, Agent, or Firm* — Meyertons, Hood, Kivlin, Kowert & Goetzel, P.C.

(57) ABSTRACT

Methods and devices are provided for MIMO OFDM transmitter and receivers having odd and/even numbers of transmit antennas. Various methods for pre-coding information bits before space time coding (STC) are described for enabling transmission of information bits over all antennas. Methods of decoding received signals that have been pre-coded and STC coded are also provided by embodiments of the invention. Pilot patterns for downlink and uplink transmission between a base station and one or more wireless terminals for three transmit antenna transmitters are also provided. Variable rate codes are provided that combine various fixed rate codes in a manner that results in codes whose rates are dependent on all the various fixed rate codes that are combined.

19 Claims, 20 Drawing Sheets

(56) References Cited

U.S. PATENT DOCUMENTS

| | | | |
|---|---|---|---|
| 2003/0048857 A1* | 3/2003 | Onggosanusi et al. | 375/267 |
| 2003/0060173 A1* | 3/2003 | Lee et al. | 455/103 |
| 2003/0067993 A1 | 4/2003 | Viswanathan | |
| 2003/0147343 A1* | 8/2003 | Onggosanusi et al. | 370/209 |
| 2005/0259627 A1* | 11/2005 | Song et al. | 370/342 |

* cited by examiner

⊘ Antenna 1
⊗ Antenna 2
⊖ Antenna 3

⊗ By Puncture

⊗ By Puncture   ⊘ Antenna 1
                ⊗ Antenna 2
                ⊖ Antenna 3

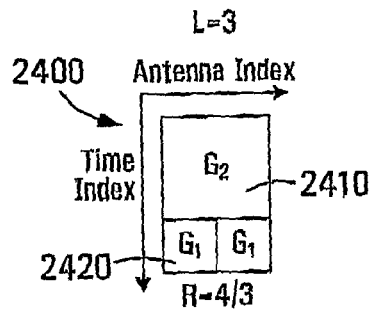
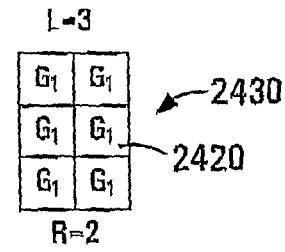
FIG. 24A      FIG. 24B
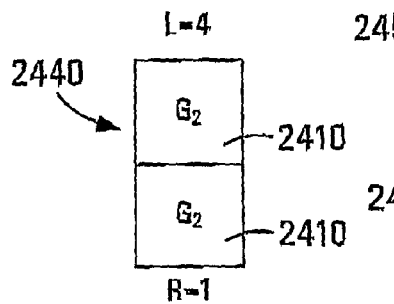
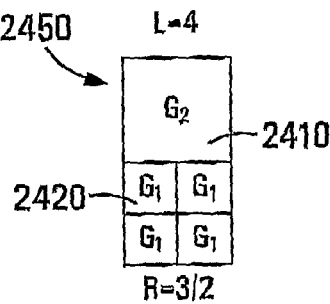
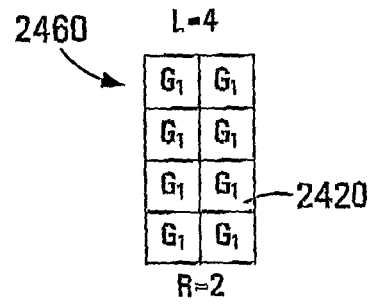
FIG. 24C    FIG. 24D    FIG. 24E
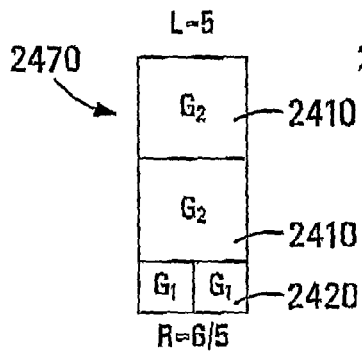
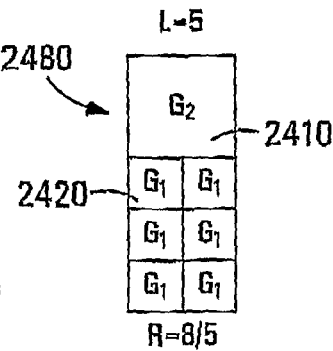
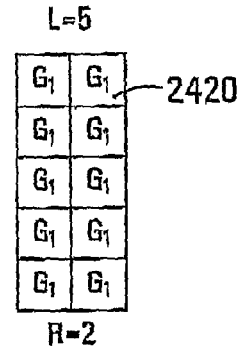
FIG. 24F    FIG. 24G    FIG. 24H

SYSTEM AND METHOD FOR MAPPING SYMBOLS FOR MIMO TRANSMISSION

RELATED APPLICATIONS

This application claims the benefit of U.S. Provisional Patent Application No. 60/585,583 filed on Jul. 7, 2004 and U.S. Provisional Patent Application No. 60/601,178 filed on Aug. 13, 2004, which are hereby incorporated by reference in their entirety.

FIELD OF THE INVENTION

The invention relates to MIMO (multiple input, multiple output) communications systems.

BACKGROUND OF THE INVENTION

Current communication techniques and associated air interfaces for wireless communication networks achieve limited capacity, access performance, and throughput. The existing specification of IEEE 802.16e has deficiencies in power balanced space time codes for odd number of transmit antennas.

Furthermore the existing specification of IEEE 802.16e has deficiencies in being able to support users on different layers with sufficient redundancy.

SUMMARY OF THE INVENTION

According to a first aspect of the invention, there is provided a method for transmitting on four transmit antennas comprising: pre-coding information bits to generate four transmit symbols; encoding two of the transmit symbols into a first Alamouti matrix and encoding another two of the transmit symbols into a second Alamouti matrix; transmitting the two Alamouti matrices on four antennas over four time intervals or four frequencies by; transmitting the first Alamouti matrix on two antennas and two of the four time intervals or two of the four frequencies; transmitting the second Alamouti matrix on the other two antennas and the other two of the four time intervals or the other two of the four frequencies; wherein the pre-coding and encoding are such that all of the information bits are represented in what is transmitted from each antenna.

According to an embodiment of the first aspect of the invention the pre-coding comprises: generating the four transmit symbols by mapping M information bits as two sets of M/2 bits, wherein the first set of M/2 bits is mapped on a first and a third $2^{(M/2)}$ QAM mapping constellation to produce first and third transmit symbols, and the second set of M/2 bits is mapped on a second and a fourth $2^{(M/2)}$ QAM mapping constellation to produce second and fourth transmit symbols, wherein the first and second transmit symbols are encoded in the first Alamouti matrix and the third and fourth transmit symbols are encoded in the second Alamouti matrix.

According to another embodiment of the first aspect of the invention the third and fourth mapping constellations are permuted mappings of the first second and mapping constellations, respectively.

According to another embodiment of the first aspect of the invention the second and fourth mapping constellations are the same as the first and third mapping constellations, respectively.

According to another embodiment of the first aspect of the invention the pre-coding comprises: mapping four pairs of information bits to 4-PSK symbols by mapping each pair of bits on a respective one of four rotated 4-PSK mapping constellations; generating transmit symbols by forming combinations of the real and imaginary components of the 4-PSX symbols.

According to another embodiment of the first aspect of the invention the method comprises forming combinations of the real and imaginary components of the 4-PSK symbols comprises generating the following transmit symbols: $s_1 = \text{Re}\{C_1\} + j\text{Re}\{C_2\}$, $s_2 = \text{Re}\{C_3\} + j\text{Re}\{C_4\}$, $s_3 = \text{Im}\{C_1\} + j\text{Im}\{C_2\}$, and $s_4 = \text{Im}\{C_3\} + j\text{Im}\{C_4\}$, where $C_1$ is the first rotated 4-PSK mapping constellation, $C_2$ is the second rotated 4-PSK mapping constellation, $C_3$ is the third rotated 4-PSK mapping constellation, and $C_4$ is the fourth rotated 4-PSK mapping constellation.

According to another embodiment of the first aspect of the invention each respective one of four rotated 4 PSK mapping constellations is rotated by an angle $\pi/4-\theta$ where $\theta = \tan^{-1}(\frac{1}{3})$.

According to another embodiment of the first aspect of the invention the pre-coding comprises: generating four transmit symbols by mapping M information bits as two sets of M/2 bits, wherein the first set of M/2 bits is mapped on one layer of a first two layer $2^{(M/2)}$ PSK mapping constellation and one layer of a second two layer $2^{(M/2)}$ PSK mapping constellation to produce first and third transmit symbols, and the second set of M/2 bits is mapped on the other layer of the first two layer $2^{(M/2)}$ PSK mapping constellation and the other layer of the second two layer $2^{(M/2)}$ PSK mapping constellation to produce second and fourth transmit symbols, wherein the first and second transmit third are encoded in the first Alamouti matrix and the third and fourth transmit symbols are encoded in the second Alamouti matrix.

According to another embodiment of the first aspect of the invention the method further comprises using a rotation angle of the rotated 4-PSK mapping constellations to increase a minimum determinant distance of a 4×4 matrix containing the first and second Alamouti matrices.

According to another embodiment of the first aspect of the invention the rotation angle is $\pi/4-\theta$ where $\theta = \frac{1}{2}\tan^{-1}(\frac{1}{2})$.

According to another embodiment of the invention, there is provided a four transmit antenna transmitter for performing the methods of the first aspect of the invention.

According to another embodiment of the invention, there is provided a device for receiving and decoding the transmitted first and second Alamouti matrices of any one of the methods of the first aspect of the invention.

According to a second aspect of the invention, there is provided a method for transmitting on three transmit antennas comprising: pre-coding information bits to generate transmit symbols; encoding the generated transmit symbols using a space time/frequency block code in which each transmit symbol appears an equal number of times and in such a manner that each of the three transmit antennas is utilized equally; transmitting the space time/frequency block code over the three antennae; wherein the pre-coding and encoding are such that all of the information bits are represented in what is transmitted from each antenna.

According to a third aspect of the invention, there is provided a method for transmitting on three transmit antennas comprising transmitting an Alamouti matrix on two antennas, time multiplexed with a single transmit symbol transmitted on a third antenna resulting in a block diagonal code matrix with 2×2 and 1×1 matrices as the diagonal elements.

According to an embodiment of the second aspect of the invention the pre-coding comprises: mapping four pairs of information bits to 4 PSK symbols by mapping each pair of bits on a respective one of four rotated 4 PSK mapping constellations; generating transmit symbols by forming combinations of the real and imaginary components of the 4 PSK symbols.

According to another embodiment of the second aspect of the invention forming combinations of the real and imaginary components of the 4 PSK symbols comprises: generating the following transmit symbols $s_1=\text{Re}\{C_1\}+j\text{Re}\{C_2\}$, $s_2=\text{Re}\{C_3\}+j\text{Re}\{C_4\}$, $s_3=\text{Im}\{C_1\}+j\text{Im}\{C_2\}$, and $s_4=\text{Im}\{C_3\}+j\text{Im}\{C_4\}$, wherein $C_1$ is the first rotated 4 PSI mapping constellation, $C_2$ is the second rotated 4 PSK mapping constellation, $C_3$ is the third rotated 4 PSK mapping constellation, and $C_4$ is the fourth rotated 4 PSK mapping constellation.

According to another embodiment of the second aspect of the invention each respective one of four rotated 4 PSK mapping constellations is rotated by an angle $z/4-\theta$ where $\theta=\tan^{-1}(1/3)$.

According to a fourth aspect of the invention, there is provided a method for transmitting a rate=1 space-time block code for a 2n+1 antenna transmitter where n>=1, the method comprising transmitting at least one code set by: for each pair of consecutive transmission intervals: on each OFDM sub-carrier of a plurality of OFDM sub-carriers, transmitting a respective Alamouti code block containing two transmit symbols on a respective pair of antennas such that all sub-carriers are used and only one pair of antennas is active during a given pair of consecutive transmission intervals for a given sub-carrier.

According to an embodiment of the fourth aspect of the invention there are three transmit antennas, and during the pair of consecutive transmission intervals every third sub-carrier starting at k is active on a first pair of transmit antennas, every third sub-carrier starting at k+1 is active on a second pair of transmit antennas, and every third sub-carrier starting at k+2 is active on a third pair of transmit antennas, where k is an index of a first subs carrier of the plurality of OFDM sub-carriers.

According to another embodiment of the fourth aspect of the invention the active antennas of the given sub-carrier alternate every pair of consecutive transmission intervals.

According to an embodiment of the fourth aspect of the invention the at least one code set is one or more of a group of code sets consisting of:

| Code Set-1 | | |
|---|---|---|
| | Time t | Time (t + T) |
| Antenna 1 | $S_1$ | $-(s_2)^*$ |
| Antenna 2 | $S_2$ | $(s_1)^*$ |

| Code Set-2 | | |
|---|---|---|
| | Time t | Time (t + T) |
| Antenna 2 | $S_3$ | $-(s_4)^*$ |
| Antenna 3 | $S_4$ | $(s_3)^*$ |

| Code Set-3 | | |
|---|---|---|
| | Time t | Time (t + T) |
| Antenna 1 | $S_6$ | $-(s_5)^*$ |
| Antenna 3 | $S_5$ | $(s_6)^*$ |

According to a fifth aspect of the invention, there is provided a method for transmitting a rate=2 spaces time block code for a three antenna transmitter, the method comprising transmitting at least one code set by: for each pair of transmission intervals; on each OFDM sub-carrier of a plurality of OFDM sub-carriers, transmitting one code set containing four transmit symbols on the three antennas such that all sub-carriers are used and all three antennas are active during a given pair of transmission intervals for a given sub-carrier.

According to an embodiment of the fifth aspect of the invention the method comprises transmitting one code set comprises transmitting an orthogonal space time/frequency code block including two transmit symbols on two transmit antennas and two transmit symbols on a third transmit antenna.

According to another embodiment of the fifth aspect of the invention the at least one code set is one or more of a group of code sets consisting of;

| Code Set-1 | | |
|---|---|---|
| | Time t | Time (t + T) |
| Antenna 1 | $S_1$ | $-(s_2)^*$ |
| Antenna 2 | $S_2$ | $(s_1)^*$ |
| Antenna 3 | $S_3$ | $(s_4)^*$ |

| Code Set-2 | | |
|---|---|---|
| | Time t | Time (t + T) |
| Antenna 1 | $S_7$ | $(s_8)^*$ |
| Antenna 2 | $S_5$ | $-(s_6)^*$ |
| Antenna 3 | $S_6$ | $(s_5)^*$ |

| Code Set-3 | | |
|---|---|---|
| | Time t | Time (t + T) |
| Antenna 1 | $S_{10}$ | $(s_9)^*$ |
| Antenna 2 | $S_{11}$ | $(s_{12})^*$ |
| Antenna 3 | $S_9$ | $-(s_{10})^*$ |

According to embodiments of the invention some of the methods further comprise: receiving feedback pertaining to transmission channels of the antennas; selecting, as a function of the feedback how the antennas are to be used in transmitting the at least one code set.

According to embodiments of the invention some of the methods comprise transmitting an Alamouti matrix on two antennas determined to be most correlated.

According to embodiments of the invention the feedback is an indicator of which antennas are moist correlated.

According to embodiments of the invention some of the methods comprise transmitting multiple code sets on a selected set of sub-carriers to introduce additional diversity gain into the system.

According to a sixth aspect of the invention, there is provided a method for generating a space time/frequency code for a multi-antenna transmitter comprising: combining various fixed rate space time/frequency codes for a given block length of time intervals or frequencies in a manner that the combination of various fixed rate space time/frequency codes utilize the entire transmission space of the given block length for each transmit antenna of the multi-antenna transmitter resulting in a space time/frequency code rate that is a function of each fixed rate space time/frequency code utilized.

According to an embodiment of the sixth aspect of the invention the method comprises combining two or more different fixed rate space time/frequency codes selected from a group of fixed rate space time/frequency codes consisting of: a fixed rate space time/frequency code comprising one symbol in one block that is capable of being transmitted on one antenna; a fixed rate space time/frequency code comprising two symbols in two blocks that are transmitted on two antennas; and a fixed rate space time/frequency code comprising three symbols in two blocks that are transmitted on three antennas.

According to embodiments of the invention, there is provided a multi-antenna transmitter for performing the methods described above.

According to a seventh aspect of the invention, there is provided a method of transmitting over three transmit antennas comprising: for each antenna, generating a respective sequence of OFDM symbols, each OFDM symbol having a plurality of sub-carriers carrying data or pilots, and transmitting the sequence of OFDM symbols; inserting pilots for the three antennas collectively in groups of pilots each group containing a pilot for each antenna, the groups scattered in time and frequency.

According to an embodiment of the seventh aspect of the invention, each group comprises one sub-carrier by three time intervals.

According to another embodiment of the seventh aspect of the invention, each group comprises one time interval by three sub-carriers.

According to another embodiment of the seventh aspect of the invention, each group comprises a first and a second pilot on a first sub-carrier over two time intervals and a third pilot on an adjacent sub-carrier located in the same time interval as one of the first and second OFDM symbols.

According to another embodiment of the seventh aspect of the invention, each group comprises, in a one sub-carrier by four time intervals arrangement or a one time interval by four sub-carriers arrangement, one pilots for each antenna in three of the four time intervals or three of the four sub-carriers, respectively.

According to another embodiment of the invention there is provided a three transmit antenna transmitter for performing the methods of embodiments of the invention described above.

According to another embodiment of the invention there is provided a device for receiving and decoding the transmitted first and second Alamouti matrices of the methods of embodiments of the invention described above.

According to another embodiment of the invention there is provided a method for transmitting on an even number of transmit antennas comprising: pre-coding information bits to generate 2N transmit symbols; encoding each pair of transmit symbols into a respective one of N Alamouti matrices; transmitting the N Alamouti matrices on 2N antennas over 2N time intervals or 2N frequencies by: transmitting each Alamouti matrix on two antennas and a respective two of the 2M time intervals or a respective two of the 2N frequencies; wherein the pre-coding and encoding are such that all of the information bits are represented in what is transmitted from each antenna.

According to another embodiment of the invention there is provided a method for transmitting on an odd number of transmit antennas comprising: pre-coding information bits to generate 2N transmit Symbols; encoding the 2N transmit symbols using a space time/frequency block code in which each transmit symbol appears an equal number of times and in such a manner that each of the transmit antennas is utilized equally; transmitting the space time/frequency block code over the transmit antennas; wherein the pre-coding and encoding are such that all of the information bits are represented in what is transmitted from each transmit antenna.

According to another embodiment of the invention, there is provided a four antenna transmitter comprising: a pre-coder for pre-coding information bits to generate four transmit symbols; and a space time/frequency block encoder for encoding and transmitting the four transmit symbols, wherein the space time/frequency block encoder encodes two of the transmit symbols into a first Alamouti matrix and encoding another two of the transmit symbols into a second Alamouti matrix and transmits the two Alamouti matrices on four antennas over four time intervals or four frequencies by: transmitting the first Alamouti matrix on two antennas and two of the four time intervals or two of the four frequencies; and transmitting the second Alamouti matrix on the other two antennas and the other two of the four time intervals or the other two of the four frequencies; wherein the pre-coding and encoding are such that all of the information bits are represented in what is transmitted from each antenna.

According to another embodiment of the invention, there is provided a three antenna transmitter comprising: a pre-coder for pre-coding information bits to generate transmit symbols; and a space time/frequency block encoder for encoding and transmitting the generated transmit symbols, wherein each transmit symbol appears an equal number of times and the three transmit antennas are utilized equally.

The three and four antenna transmitters contain hardware and/or software for performing the pre-coding and encoding. In some embodiments of the invention, the hardware may include an application specific integrated circuit (ASIC), digital signal processing (DSP) chip, or field programmable gate array.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 24A-24H is a collection of schematic diagrams of variable rate STC codes for two transmit antennas according to embodiments of the invention; and FIG. 25A-25E is a collection of schematic diagrams of variable rate STC codes for three transmit antennas according to embodiments of the invention.

DETAILED DESCRIPTION OF THE PREFERRED EMBODIMENTS

By way of background to more fully understand embodiments of the invention, a basic Multiple Input Multiple Output-Orthogonal Frequency Division Multiple Access (MIMO-OFDMA) air interface is described below, for IEEE 802.16e for instance, to enable the joint exploitation of the spatial time frequency and multi-user-diversity dimensions to achieve very high capacity broadband wireless access for both nomadic and mobile deployments. OFDM transmission may be used for down-link (DL) and/or up-link (UL) transmissions to increase the capacity and quality of the access performance. MIMO transmission may be used to increase the network and user throughput, and multi-beam forming transmission may be used to increase aggregated network capacity. A more detailed description of an example of a MIMO-OFDMA air interface is found in WO/2005/096531, which is incorporated herein by reference in its entirety.

By way of overview in a MIMO-OFDM system, each user can be mapped onto a different OFDM resource which might be a sub-channel, e.g. an AMC (adaptive modulation and coding) sub-channel and/or a diversity sub-channel. For Single Input single Output (SISO) systems, user mapping is preferably dependent on a channel quality indicator (CQI) only, while for the MIMO case, mapping is preferably dependent on the auxiliary metric channel eigenvalue indicator (CEI) in addition to CQI. For MIMO users, preferably, multiple different space-time coding schemes are supported such as SM (spatial multiplexing) and STUD (space-time transmit diversity).

On a continuous basis, there is a stream of OFDM symbols associated with each transmit antenna. Each user may be first mapped onto one or multiple OFDM symbols and each OFDM symbol may then be mapped onto its associated antenna. Such mapping also allows per-antenna rate control (PARC) to be performed in some implementations.

Each OFDM symbol may be mapped onto its associated antenna in the sub-carrier domain. For certain sub-carriers, if no specific user data is mapped, then a null assignment to such sub-carrier may be fed into the corresponding antenna.

Figure 1A:
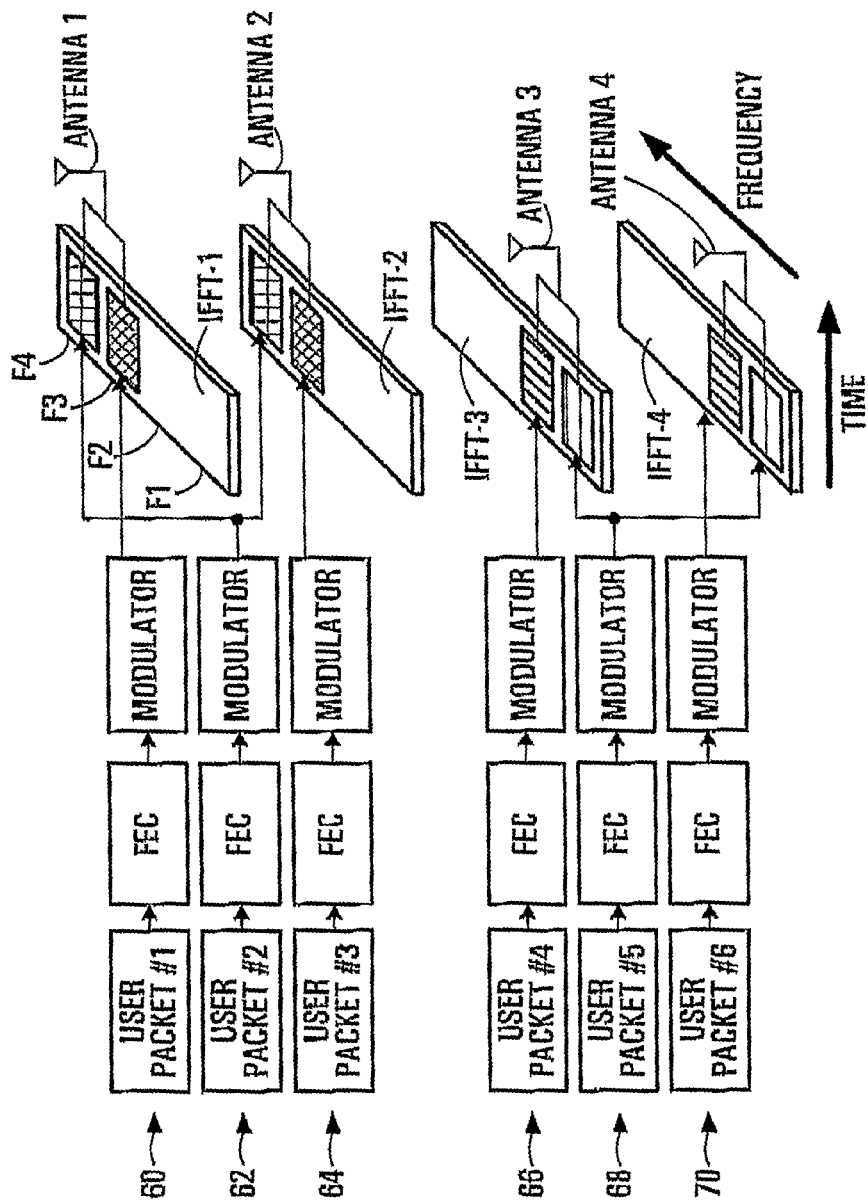
FIG. 1A though FIG. 1E are block diagrams showing an example user to sub-channel and antenna mapping scheme.

A very simple example of what might be transmitted at a specific instant in time as a result of a particular OFDM symbol and antenna mapping is shown in FIG. 1A. FIG. 1A shows a four antenna transmit system that, in the instance depicted, is being used to transmit six user packets 60,62,64, 66,68,70 each of which undergoes FEC (forward error correction) and modulation. A specific mapping of the six packets of six users is shown for a particular time instant. Over time, the number of users, and/or the manner in which the user packets are mapped are preferably dynamically changing.

For the particular time instant, the OFDM bandwidth is allocated in four distinct frequency bands F1,F2,F3,F4. These might for example be considered AMC (adaptive modulation and coding) sub-channels. A similar approach can be employed for diversity sub-channels.

Each packet is to be mapped onto the four antennas using a selected mapping scheme. In some situations, multiple different schemes are available for a given number of transmit antennas and receive antennas. For example, for a 2×2 system, preferably STTD or SM (BLAST) can be selected. In other situations only a single scheme is implemented for each antenna permutation. Single antenna users use a SISO (which may involve PARC) transmission scheme.

The first packet 60 is transmitted using only antenna 1 on band F3 implying a 1×1 SISO transmission.

The second packet 62 is transmitted on both antennas 1 and 2 in band F4 implying a 2×1, 2×2 or 2×4 MIMO transmission.

The third packet 64 is transmitted only on antenna 2 in band F3, again implying a 1×1 SISO transmission.

The fourth packet 66 is transmitted on band F2 over antenna 3.

The fifth packet 68 is transmitted on band F1 on both of antennas 3 and 4.

Finally, packet 70 is transmitted on only band F2 of antenna 4.

Generally, each packet can be mapped individually to some or all of the antennas. This enables MEMO and non-MIMO users to be mixed. In the above example, packets 60, 64, 66 and 70 are for non-MIMO users. Packets 62 and 64 are for MIMO users.

Please note that the flexible mapping of MIMO and non-MIMO users is applied both in the context of "partial utilization" and "full utilization". With partial utilization, a given base station only has access to part of the overall OFDM band. In this case, the sub-bands F1,F2,F3,F4 defined for the example of FIG. 1A would fall within the defined part of the overall band. With partial utilization, different base stations that are geographically proximate may be assigned different bands. With full utilization, each base station uses the entire OFDM hand. With ouch an implementation, for the particular example of FIG. 1A the sub-bands F1,F2,F3,F4 would map to the entire band.

For SISO users, a single band on a single antenna will be used. As discussed, for a MIMO user the configuration is denoted as $N_T \times N_R$.

The flexible structure illustrated by way of example in FIG. 1A can be used far both STTD and BLAST. For example, the packet 62 may be transmitted using the band F4 on antennas 1 and 2 using either BLAST or STTD.

The particular example shown in FIG. 1A is designed to show the co-existence of SISO and MIMO be it STTD and/or BLAST. Of course the number of sub-bands, and their shape, size, locations etc., within the OFDM band are implementation specific details. The mapping can be done on a per OFDM symbol basis, or for multiple OFDM symbols.

Another way to think of this is that each time-frequency block that is defined can have its own matrix. Once the matrix is specified, the number of antennas at the output is defined. For example, a 2×2 matrix requires two antennas; a 4×4 matrix requires four antennas. The matrix also determines, not necessarily uniquely, the number of different users that can be mapped. Particular examples are given in the tables below.

The content for multiple users of course needs to be mapped in a manner that is consistent and non-conflicting. Also, each user needs to be informed of where/when its content will be transmitted. Details of a method of performing this signalling are defined in WO/2005/099290, which is incorporated by reference in its entirety.

For each individual user, the antenna mapping enables STTD, SM and PARC transmissions for either the AMC sub-channel or the diversity sub-channel. Any one of six different mapping configurations can be applied to each individual user, including three 4-transmit antenna mappings, 2-transmit antenna mappings and a single antenna mapping.

The uplink may include, for example, two modes; (1) STTD for dual transmit antenna capable wireless terminals and (2) Virtual-MIMO for single transmit antenna capable wireless terminals.

Referring now to FIGS. 1B,1C,1D and 1E shown are specific transmitter configurations. The transmitter may be dynamically reconfigurable to enable transmission to multiple users using respective transmission formats. The particular examples of FIGS. 1B,1C,1D, and 1E below can be considered "snapshots" of such a reconfigurable transmitter, These configurations can also exist simultaneously for different sub-bands of an overall OFDM band that is being employed. For example, the configuration of FIG. 1B might be used for a first set of sub-channels or a first OFDM band and associated user(s); the configuration of FIG. 1C might be used for a second set of sub-channels or a second OFDM band and associated user(s) and so on. Of course, many of the components that are shown as being replicated would not need to be physically replicated. For example, a single IFFT and associated transmit circuitry can be used per antenna with the different mappings being performed and then input to appropriate sub-carriers of the IFFT.

Figure 1B:
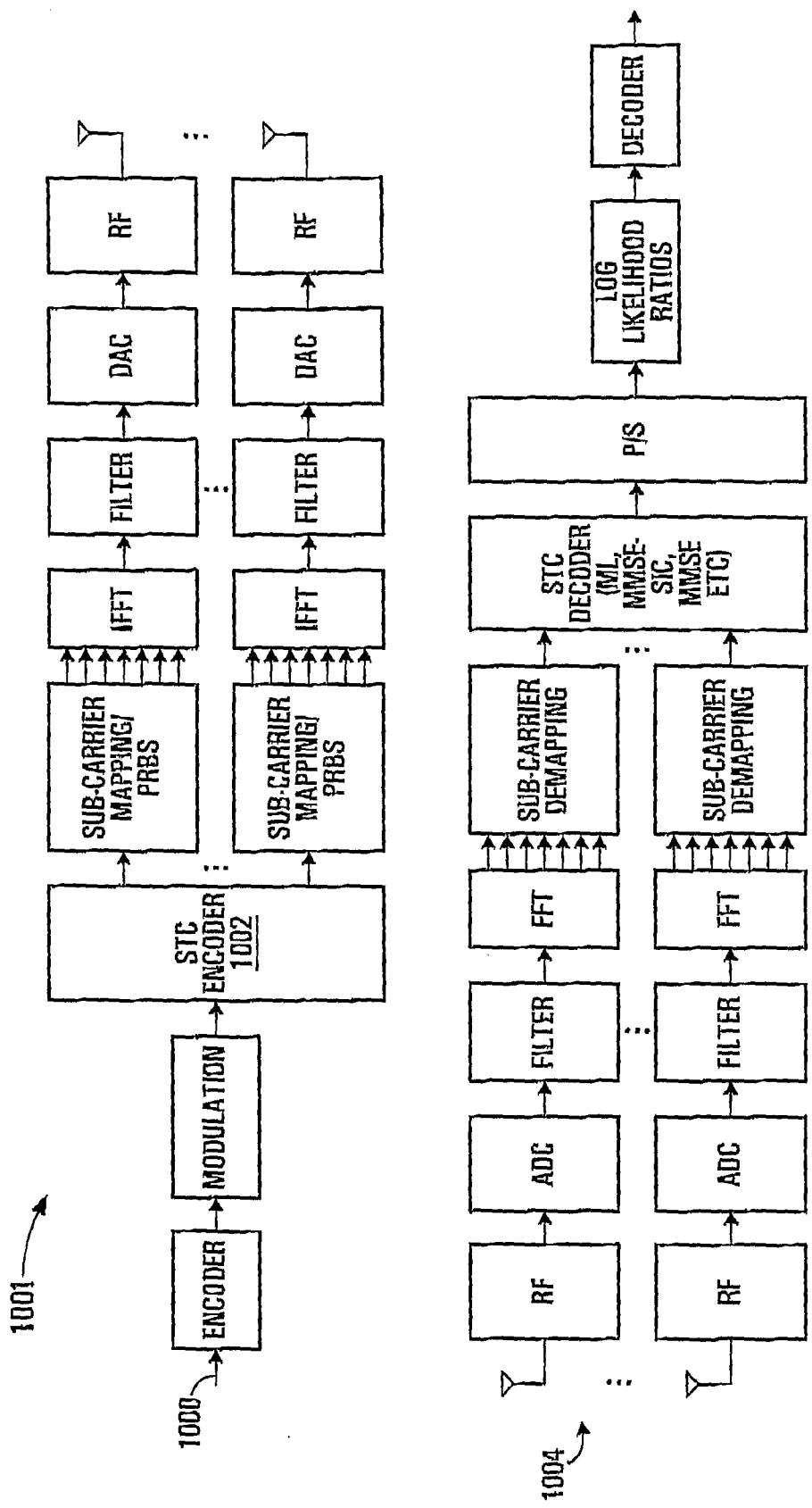

FIG. 1B shows an example configuration with a matrix that performs STTD encoding based on a single input stream, and with horizontal encoding for two, three or four transmit antennas. In a transmitter structure, generally indicated at 1001, an input stream 1000 is encoded, also referred to as pre-coded, and modulated and then She encoded in space time encoder 1002 having two, three or four outputs that are then fed to respective transmit chains and transmitted. A corresponding receiver structure is indicated generally at 1004.

Figure 1C:
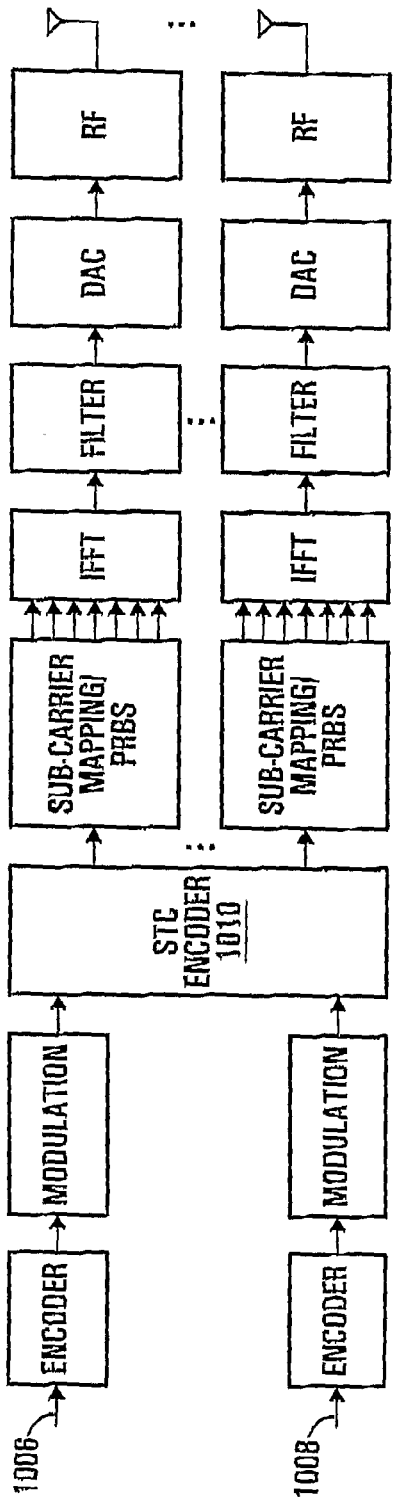

FIG. 1C shows an example configuration with a matrix that performs STTD encoding for multiple input streams, and with horizontal encoding for two, three or four transmit antennas. Input streams 1006,1008 (only two shown, more possible) are encoded and modulated and then STC encoded in space time encoder 1010 having two, three or four outputs that are then fed to respective transmit chains and transmitted STTD matrices are examples of matrices that may be employed; other matrices are possible.

Figure 1D:
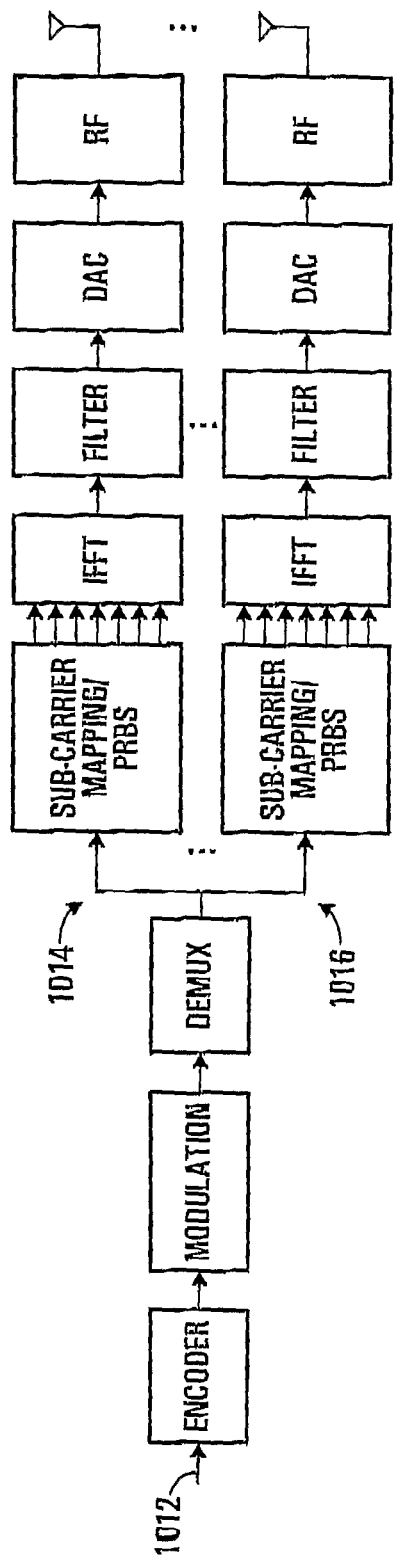

FIG. 1D shows an example configuration with a matrix that performs SM (e.g. BLAST) encoding for a single input stream. Input stream 1012 is encoded and modulated and then demultiplexed into two, three or four streams 1012,1014 that are fed to respective transmit chains and transmitted. SM matrices are examples of matrices that may be employed; other matrices are possible. This is an example of so-called "vertical encoding" where the input symbols of a given input stream are vertically distributed (i.e. simultaneous in time) between the multiple antennas.

Figure 1E:
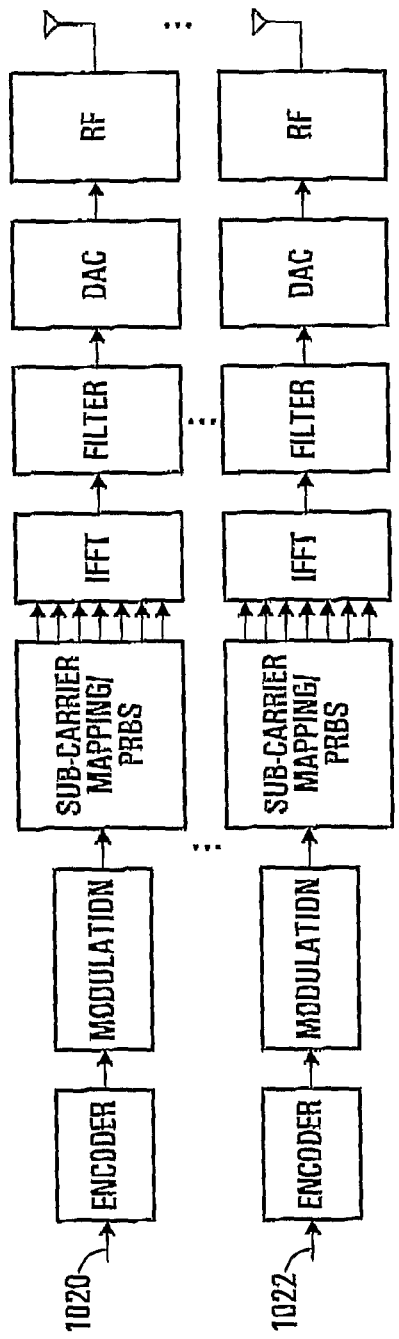

FIG. 1E shows an example configuration with a matrix that performs SM (e.g. BLAST) encoding for multiple input streams. Input streams 1020, 1022 (only two shown, more possible) are encoded and modulated fed to respective transmit chains and transmitted SM matrices are examples of matrices that may be employed; other matrices are possible.

This is an example of so-called "horizontal" encodings where the input symbols of a given input stream are horizontally distributed (i.e. sequentially in time) on a single antenna.

Pre-Coding for Four Transmit Antennas

Rate=1 space time block codes (STBC) or space frequency block codes (SFBC) for four transmit antennas, examples of which are more fully disclosed in WO/2005/096519, provide a diversity order of one per transmit symbol, while achieving full diversity with the help of FEC codes. A diversity order equal to one means that in four time intervals, four transmit symbol are transmitted. An example of such a rate=1 STBC code is presented below in which two 2.times.2Alamouti code blocks are located on the diagonal of the SFBC code.

$$\begin{bmatrix} s_1 & s_2 & 0 & 0 \\ -s_2^* & s_1^* & 0 & 0 \\ 0 & 0 & s_3 & s_4 \\ 0 & 0 & -s_4^* & s_3^* \end{bmatrix}$$

The code matrix for the Alamouti code is presented below.

|  | Time t | Time (t + T) |
| --- | --- | --- |
| Antenna 1 | $s_1$ | $s_2$ |
| Antenna 2 | $-s_2^*$ | $s_1^*$ |

The Alamouti code has several properties, which makes it perfect for space diversity. The signals are orthogonal; hence full diversity is achieved at the receiver side. The transmit power is balanced between the two antennas (and the two time slots); hence a low cost power amplifier can be used, which in turn reduces the modem cost. Its code rate is 1; hence no throughput is sacrificed. Its maximum likelihood decoder is very simple, which makes the cost of an optimal decoder negligible.

This is only one example of an STBC code using Alamouti codes. Further STBC codes with different arrangements of transmit Symbols are described in WO/2005/096519, which is hereby incorporated by reference in its entirety.

A known pre-coding technique identified below can be used in generating the transmit symbols $[s_1, s_2, s_3, s_4]$ by multiplying a pre-coding symbol matrix with a vector of information symbols $[C_1, C_2, C_3, C_4]$.

$$\begin{bmatrix} s_1 \\ s_2 \\ s_3 \\ s_4 \end{bmatrix} = \frac{1}{\sqrt{2}} \begin{bmatrix} 1 & \alpha_0 & 0 & 0 \\ 0 & 0 & 1 & \alpha_1 \\ 1 & \alpha_2 & 0 & 0 \\ 0 & 0 & 1 & \alpha_3 \end{bmatrix} \begin{bmatrix} C_1 \\ C_2 \\ C_3 \\ C_4 \end{bmatrix}$$

The vector $[C_1, C_2, C_3, C_4]$ includes information symbols for rate=2 QPSK (quadrature phase shift keying). The information symbols for example may each represent a pair of bits. The pre-coding symbol matrix is one example of such a matrix used in a pre-coding operation.

In an optimal pre-coding symbol matrix the parameters are governed by the relationships $|\alpha_0 - \alpha_2| = \pi$ and $|\alpha_1 - \alpha_3| = \pi$ where $\alpha_0 = e^{j\pi/4}$, $\alpha_1 = e^{j\pi 5/4}$.

Figure 2:
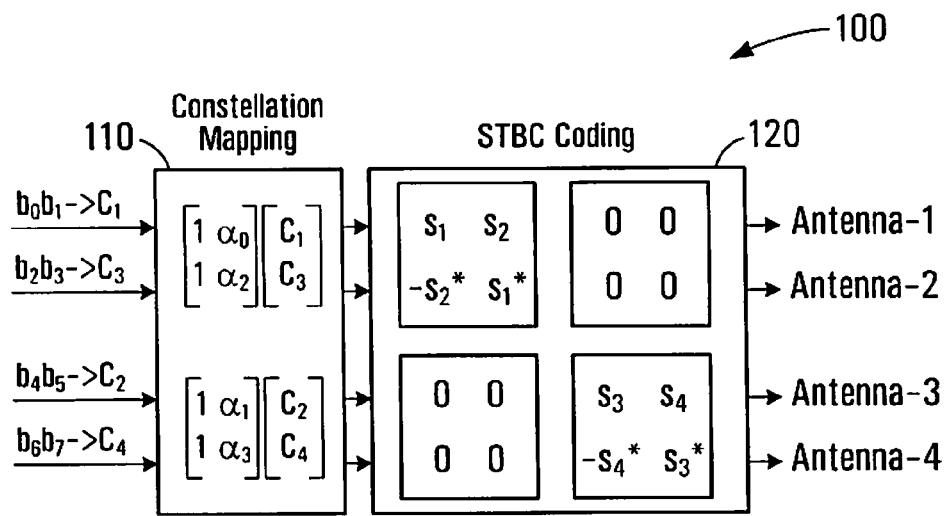
FIG. 2 is a schematic diagram for a four antenna transmitter including a known pre-coding structure.

FIG. 2 illustrates an example of a tour antenna transmitter, generally indicated at 100, including a constellation mapping component 110 and a STBC coding component 120. Transmission data bits $b_0$ and $b_1$ are included in information symbol $C_1$, transmission data bits $b_2$ and $b_3$ are included in information symbol $C_3$, transmission data bits $b_4$ and $b_5$ are included in information symbol C2, and transmission data bits $b_6$ and $b_7$ are included in information symbol $C_4$. The pre-coding operation described above results in $s_1$ being dependent upon $C_1$ and $C_3$ and $s_3$ being dependent upon $C_1$ and $C_3$. Symbol $s_3$ is a permutation of symbol $s_1$ due to the relationship of $\alpha_0$ and $\alpha_2$, as noted above. Similarly, symbol $s_2$ and symbol $s_4$ are dependent on both $C_2$ and $C_4$.

Figure 3:
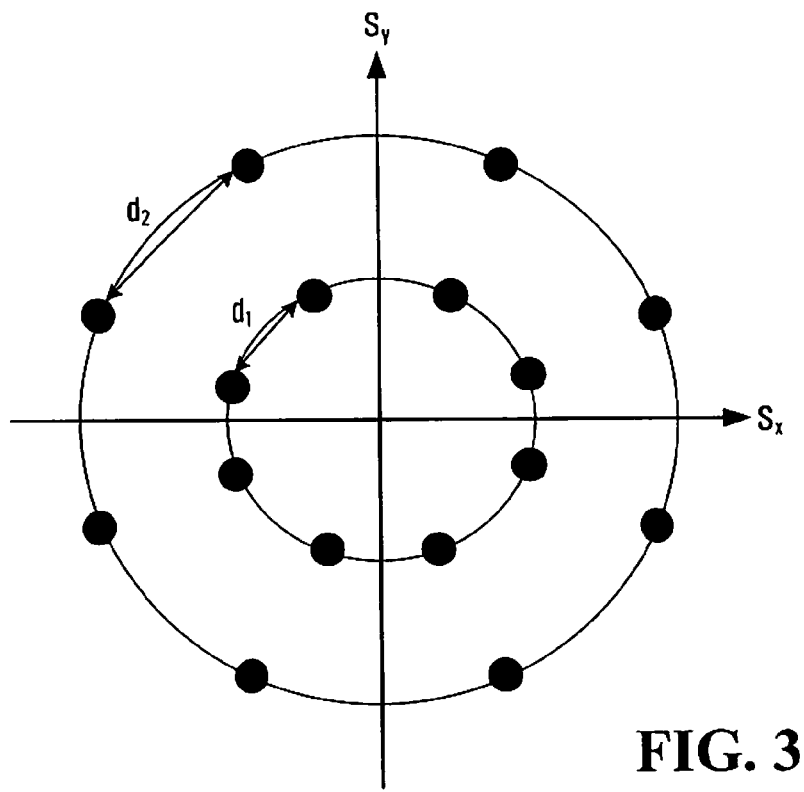
FIG. 3 is a graphical representation of a constellation mapping utilized by the transmitter of FIG. 1.

FIG. 3 is a 16 QAM constellation map for mapping a 4 bit symbol. With respect to the above known pre-coding symbol matrix, for $\alpha_0 = \alpha_2$, the minimum distance between symbols on an inner radius of symbols is $d_1$ as shown in FIG. 3. The minimum distance between symbols in the outer radius is equal to $d_2$. For $\alpha_0 = \alpha_2 e^{j\pi}$, the minimum distance between symbols is $\sqrt{d_1 d_2}$. Furthermore, when $\alpha_0 = \alpha_2 e^{j\pi}$ the symbols on the inner and outer radii are interchanged.

Figure 4:
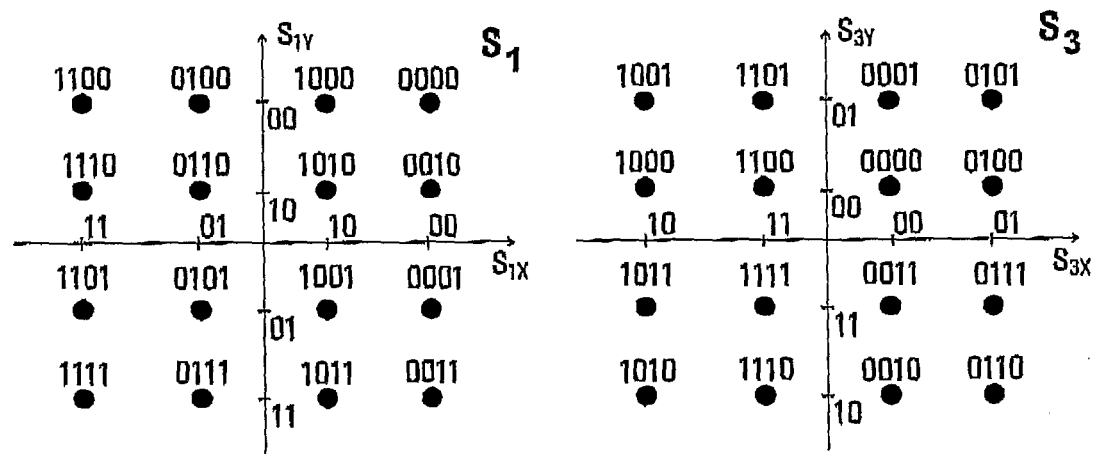
FIG. 4 is a graphical representation of a 16 QAM constellation mapping for use by embodiments of the invention.

As an alternative to known methods of sending independent QPSK symbols for transmit symbols $s_1$ and $S_3$ (as well as $s_2$ and $s_4$) in the STCB code, an embodiment of the invention includes encoding, or pre-coding, two sets of four bits in such a manner than they are inter-dependent. A first set of four bits are mapped onto two different 16 QAM (guadrature amplitude modulation) constellation mappings, $S_1$ and $S_3$ as shown in FIG. 4, which result in the generation of two transmit symbols, $s_1$ and $s_3$. Transmit symbols $s_1$ and $s_3$ each contain the first set of four bits, but mapped differently. Similarly, transmit symbols $s_2$ and $s_4$ are generated by pre-coding a second set of four bits on two 16 QAM constellation mappings, for example $s_2$ and $s_4$. The 16 QAM constellation mapping is a specific example mapping. More generally, sets of i bits are mapped to M-ary QAM constellation mappings where $M=2^i$, $i>=2$.

The four transmit symbols $s_1$, $s_2$, $s_3$ and $s_4$ are then STBC coded for transmission on a four antenna transmitter, for example as follows:

$$\begin{bmatrix} s_1 & s_2 & 0 & 0 \\ -s_2^* & s_1^* & 0 & 0 \\ 0 & 0 & s_3 & s_4 \\ 0 & 0 & -s_4^* & s_3^* \end{bmatrix}.$$

The STBC code rows include symbols to be transmitted by a particular transmit antenna and the STBC code columns include symbols to be transmitted in time or frequency. Since the generated transmit symbols $s_1$ and $s_3$ each represent the same four information bits mapped using two different constellation mappings $S_1$ and $S_3$ and the generated symbols $s_1$ and $s_3$ are transmitted on pairs of antennas 1 and 2, and 3 and 4, respectfully then the four information bits are transmitted over all four antennas. The same process occurs for the second four information bits. The fact that all bits are transmitted over all four antennas provider additional diversity to the system.

In some embodiments the constellation mapping used for $S_3$ is a permutation, essentially a relabeling, of $S_1$. The same bits used to map to transmit symbol $s_1$ are used to map to symbol $s_3$ using a different permuted constellation. An example set of permuted constellation mappings for $S_1$ and $S_3$ are shown in FIG. 4. The 16 QAM constellation for $S_1$ shows an x-axis labelled as $s_{1X}$ and a y-axis labelled as $S_{1Y}$. The x-axis has coordinate values 11, 01, 10, 00 from the "negative" side to the "positive" side of the axis. The y-axis has coordinate values 11, 01, 10, 00 from the "negative" side to the "positive" side of the axis. These coordinate values represent two 4 PAM (pulse amplitude modulation). Using these x and y-axis coordinates values, the four bit information symbol values are mapped where the first two bits are the x-axis coordinate values and the second two bits are the y-axis coordinate values. For example, a symbol mapped to $S_1$ is $S_{1X} \times S_{1Y}$. Similar axis labelling is used for $S_3$, and a symbol mapped to $S_3$ is $S_{3X} \times S_{3Y}$. In some embodiments, $S_{1X}$ and $S_{3X}$ are dependent and $S_{1Y}$ and $S_{3Y}$ are dependent based on the permutation described above. A similar constellation is shown for $S_3$, except that the x-axis has coordinate values 10, 11, 00, 01 from the "negative" Bide to the "positive" side of the axis. The y-axis has coordinate values 10, 11, 00, 01 from the "negative" side to the "positive" side of the axis. It can be seen that the value in the first coordinate value of $S_{1X}$ is the value in the second coordinate value of $S_{3X}$, the value in the second coordinate value of $S_{1X}$ is the value in the fourth coordinate value of $S_{3X}$, the value in the third coordinate value of $S_{1X}$ is the value in the first coordinate value of $S_{3X}$, and the value in the fourth coordinate value of $S_{1X}$ is the value in the third coordinate value of $S_{3X}$. It is in this way that $S_3$ is a different permuted constellation of $S_1$ as described above. It is to be understood that this is one example of such a permutation and that other types of permutation are to be considered within the scope of the invention.

Therefore, a method for pre-coding information and transmitting the generated transmit symbols includes a first step of grouping eight information bits into two sets of four bits, using the first set of four bits to address constellation $S_1$ in FIG. 4 and to address constellation $S_3$ in FIG. 4 to produce transmit $s_1$ and $s_3$ respectively. Similarly, using the second set of four bits to address constellation $S_1$ in FIG. 4 and to address constellation $S_3$ to produce transmit symbols $s_2$ and $s_4$, respectively. More generally, a different pair of constellations may be used to generate transmit symbols $s_2$ and $s_4$. In a second step, the resulting transmit symbols are encoded with a desired STBC or SFBC code and transmitted on the four antennas.

More generally, the pre-coding method can be applied to any even number of antennas by pre-coding information bits to generate 2N transmit symbols; encoding each pair of transmit symbols into a respective one of N Alamouti matrices; transmitting the N Alamouti matrices on 2N antennas over 2N time intervals or 2N frequencies by; transmitting each Alamouti matrix on two antennas and a respective two of the 2N time intervals or a respective two of the 2N frequencies; wherein the pre-coding and encoding are such that all of the information bits are represented in what is transmitted from each antenna.

For example, two sets of bits are each mapped to three different M-ary QAM mapping constellations to generate a total of six transmit symbols. The six transmit symbols are encodes using three Alamouti codes, in a similar way that four transmit symbols are encoded on two Alamouti codes as described above. As each of the two sets of bits are represented in all three Alamouti matrices, all of the information bits are represented in what is transmitted from each antenna.

Figure 5:
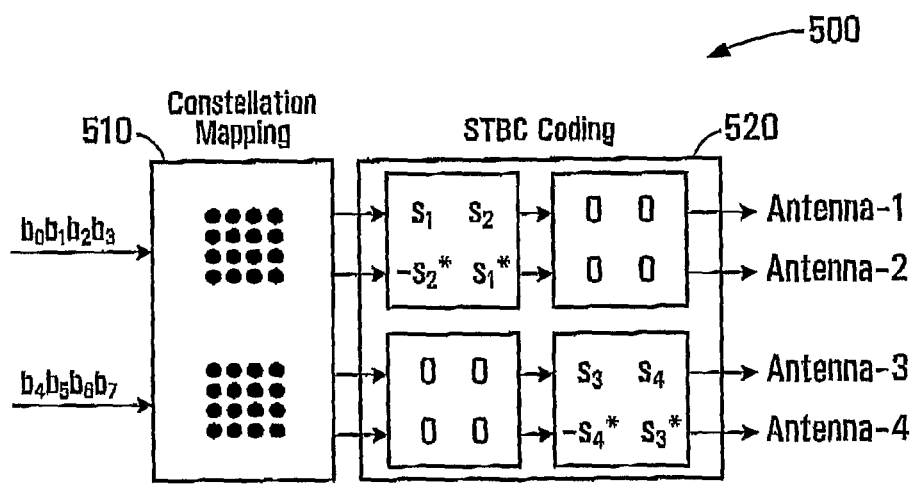
FIG. 5 is a schematic diagram for a four antenna transmitter according to an embodiment of the invention.

FIG. 5 illustrates an example of a four antenna transmitter, generally indicated at 500, including a constellation mapping component 510 and a STBC coding component 520 for implementing embodiments of the invention. Two sets of four information data bits, $b_0 b_1 b_2 b_3$ and $b_4 b_5 b_6 b_7$ are input to the constellation mapping component 510. As described above the first set of four information bits are mapped to constellation $S_1$ in FIG. 4 and mapped to constellation $S_3$ in FIG. 4 to produce transmit symbols $s_1$ and $s_3$ respectively. With the second group of four information bits $b_4 b_5 b_6 b_7$, similar mappings are done to generate transmit symbols $s_2$ and $s_4$. The respective values output from the constellation mapping component 510 for transmit symbols $s_1$, $s_2$, $s_3$ and $s_4$ are in input to the STBC coding component 520, where the transmit symbols are arranged in the desired STBC code or SFBC code described above.

Figure 6:
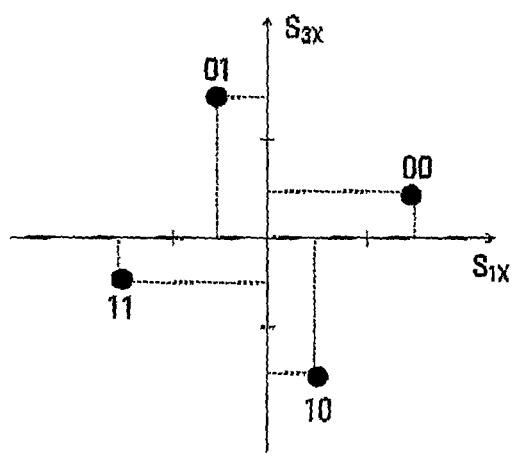
FIG. 6 is a graphical representation of a constellation construction according to an embodiment of the invention.

FIG. 6 illustrates an intermediate mapping generated by combining the real components of the mappings to $S_1$ and $S_3$. The intermediate mapping of FIG. 6 has an x-axis that corresponds to the x-axis of $S_1$, $S_{1X}$, and a y-axis that corresponds to the x-axis of $S_3$, $S_{3X}$. The four symbols in the intermediate mapping are the coordinates of equal two bit values of $S_{1X}$ and $S_{3X}$, that is for example for $S_{1X}=00$ and $S_{3X}=00$. Similar intermediate mappings are provided for $S_{1Y}$ and $S_{3Y}$, $S_{2X}$ and $S_{4X}$, and $S_{2Y}$ and $S_{4Y}$. In some embodiments of the invention the four intermediate mappings can be used in pre-coding to provide that all information bits are spread over all four transmit antennas. For example, eight information bits are provided for pre-coding in four sets of two bits. Each set of two bits is supplied to one of the four intermediate mappings described above. The transmit symbols are then generated by combining the real and imaginary components of the four intermediate mappings. Assuming the four intermediate mappings are defined as $C_1 = S_{1X} \times S_{3X}$, $C_2 = S_{1Y} \times S_{3Y}$, $C_3 = S_{2X} \times S_{4X}$ and $C_4 = S_{2Y} \times S_{4Y}$, an example of the resulting transmit symbols is $s_1 = \text{Re}\{C_1\} + j\text{Re}\{C_2\}$, $s_2 = \text{Re}\{C_3\} + j\text{Re}\{C_3\}$, $s_3 = \text{Im}\{C_1\} + j\text{Im}\{C_2\}$, and $s_4 = \text{Im}\{C_3\} + j\text{Im}\{C_4\}$. In this case all four sets of two information bits are represented on all four antennas providing additional diversity.

Figure 7:
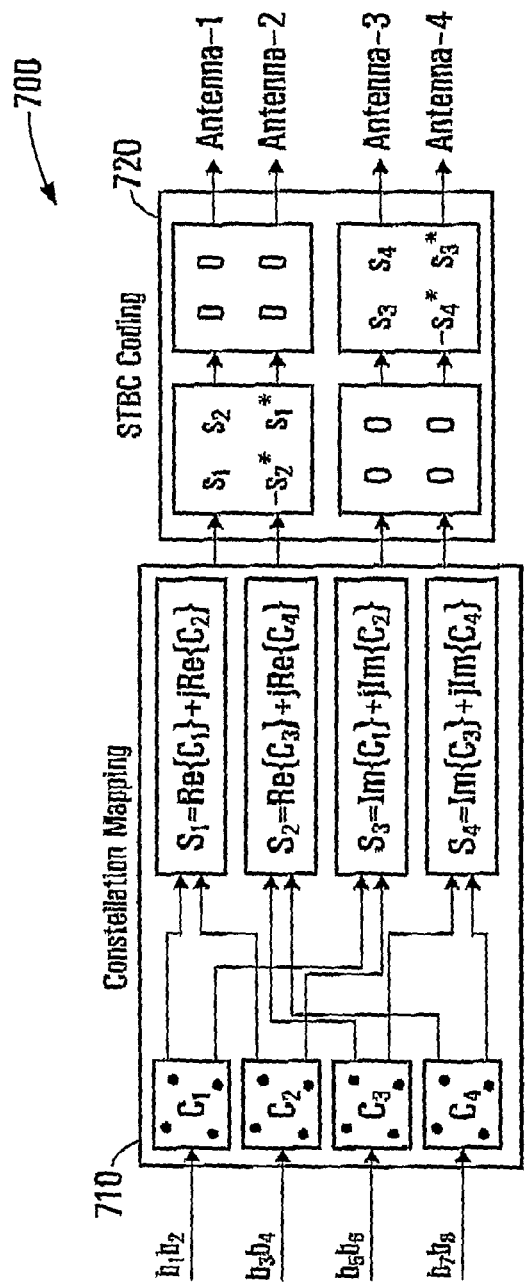
FIG. 7 is a graphical representation of a constellation of a transmitted codeword generated according to an embodiment of the invention.

FIG. 7 illustrates another example of a four antenna transmitted, generally indicated at 700, including a constellation mapping component 710 and a coding component 720. The constellation mapping component 710 utilizes four intermediate mappings described above and contains logic to combine the real and imaginary aspects of the mapped symbols to generate the transmit symbols. Transmission data bits $b_0$ and $b_1$ are used to map on intermediate mapping $C_1$, transmission data bits $b_2$ and $b_3$ are used to map on intermediate mapping $C_2$, transmission data bits $b_4$ and $b_5$ are used to map on intermediate mapping $C_3$, and transmission data bits $b_6$ and $b_7$ are used to map on intermediate mapping $C_4$. The respective real and imaginary components of information symbols $C_1$ and $C_2$ are used to generate transmit symbols $s_1$ and $s_3$ and the respective real and imaginary components of information symbols $C_3$ and $C_4$ are used to generate transmit symbols $s_2$ and $s_4$. The transmit symbols $s_1$, $s_2$, $s_3$ and $s_4$ are then supplied to STBC coding component 720 to be assigned to the desired STBC code or SFBC code, an example of which is shown in FIG. 7.

Decoding

In a preferred implementation of the pre-coding method, $\text{Re}\{s_1\}$ is only related to $\text{Re}\{s_3\}$ and $\text{Im}\{s_1\}$ is only related to $\text{Im}\{s_3\}$. In an example method of decoding, Alamouti decoding is performed first to find the scaled estimated symbol $\{\tilde{s}_1, \tilde{s}_2, \tilde{s}_3, \tilde{s}_4\}$:

$$\tilde{s}_1 = \frac{(h_1^* r_1 + h_2 r_2^*)}{\delta_{12}^2} = s_1 + \frac{(h_1^* n_1 + h_2 n_2^*)}{\delta_{12}^2}$$

where $h_1$ and $h_2$ are channel parameters, $n_1$ and $n_2$ are noise parameters, and $\delta^2_{12} = |h_1|^2 + |h_2|^2$. Now, we consider $\text{Re}\{\tilde{s}_1\} + j\text{Re}\{\tilde{s}_3\}$ to find the maximum likelihood estimated of $\text{Re}\{S_1\}$ and $\text{Re}\{S_3\}$. Typically the noise power in the two dimensions are equal. Therefore, the minimum Euclidean distance between $\text{Re}\{\tilde{s}_1\} + j\text{Re}\{\tilde{s}_3\}$ and $\delta_{12}\text{Re}\{S_1\} + j\delta_{34}\text{Im}\{S_3\}$ can be found, which is a search over four different points.

Table 1 includes the number of computational operations performed at each defined step for decoding a received signal that has been pre-coded with the inventive pre-coding method and STBC coded such as would be transmitted from transmitter of the type of FIG. 5 as compared to the number of computational operations performed at each defined step for decoding a received signal that is pre-coded and STBC coded by the transmitter of FIG. 2. The column entitled "IEEE802.16d" is provided to indicate the number of operations used to decode an Alamouti matrix for each STTD block that has not been pre-coded according to the IEEE802.16d standard. One real multiplication operation is equal to one real add, which in represented by A, one complex multiplication operation is equal to four real multiplication operations and two real add operations for a total of six seal adds, which is represented by M, one complex add operation is equal to 2 real adds, which is represented by m, and a real add is represented by a. Each "computation" and "LUT" (Look-Up Table) operation is respectively the computational equivalent operation of one real add. The inventive pre-coding method uses lens computational power to decode the received pre-coded and STBC coded signal than for the other types of coded signals as it is less complex.

TABLE 1

Computational Complexity Analysis

| | | IEEE802.16d | Coding using Transmitter of FIG. 2 | Coding using Transmitter of FIG. 5 |
|---|---|---|---|---|
| Step-1 | Alamouti decoding for each STTD block | 4(2M + A + 2m) | 4(2M + A + 2m) | 4(2M + A + 2m) |
| Step-2 | Compute the weighted distance over all 16 constellation points | 0 | 2 × 16 × (2 (1M + 1A) + 1a) | 4 × 4 × (2 (1m + 1a) + 1a) |
| Step-3 | Find the maximum distance | 0 | 2 × 16 comp | 4 × 4 comp |
| Step-4 | Generate 4 bit LLR | 0 | 2 × 4 × 8 LUT | 4 × 2 × 2 LUT |
| Total | Step-1, Step-2 Step-3 and Step-4 | 8M + 4A + 8m | 72M + 68A + 8m + 32a + 32comp + 64LUT | 8M + 4A + 40m + 48a + 16comp + 16LUT |
| Total | | 64 | 674 | 176 |
| Ratio | | 1 | 10.5 | 2.7 |

Optimized Rotation

In the inventive code, $Re\{S_1\}+jRe\{S_3\}$ an represented in the mapping constellation of FIG. 6 (similarly, $Re\{S_2\}+jRe\{S_4\}$, $Im\{S_1\}+jIm\{S_3\}$ and $Im\{S_2\}+jIm\{S_4\}$), can be considered as a symbol of a 4 PSK (pulse shift keying) constellation mapping rotated by an angle $\pi/4-\theta$ where $\theta=\tan^{-1}(1/3)$. The angle of rotation can be optimized to increase the minimum determinant distance of the code. In a preferred embodiment for an optimized rotation:

$$4\sin\theta\cos\theta = (\cos\theta - \sin\theta)(\cos\theta + \sin\theta) \Rightarrow \theta = \frac{1}{2}\tan^{-1}(1/2).$$

Changing the rotation angle does not affect the complexity of decoding and encoding.

Optimizing the angle of rotation applies to prey coding for use with four transmit antennas described above as well as to pre-coding for use with three transmit antennas described below.

TABLE 2

Performance Analysis

| | Minimum determinant distance |
|---|---|
| Coding using Transmitter of FIG. 2 | 0.414 |
| Coding using Transmitter of FIG. 5 (QAM) | 0.4 |
| Coding using Transmitter of FIG. 5 (optimised rotation) | 0.447 |
| IEEE802.16d | 0 |

In another embodiment of four transmit antenna pre-coding, instead of sending independent QPSK signals for symbols $s_1$ and $s_3$ (as well as symbols $s_2$ and $s_4$), dependant two-layer 8PSK signals are transmitted. In some embodiments, the mapping constellation for the two-layer 8PSK signal generating symbol $s_3$ is a permutation (relabeling) of the mapping constellation for the two-layer 8PSK signal generating symbol $s_1$.

Figure 8:
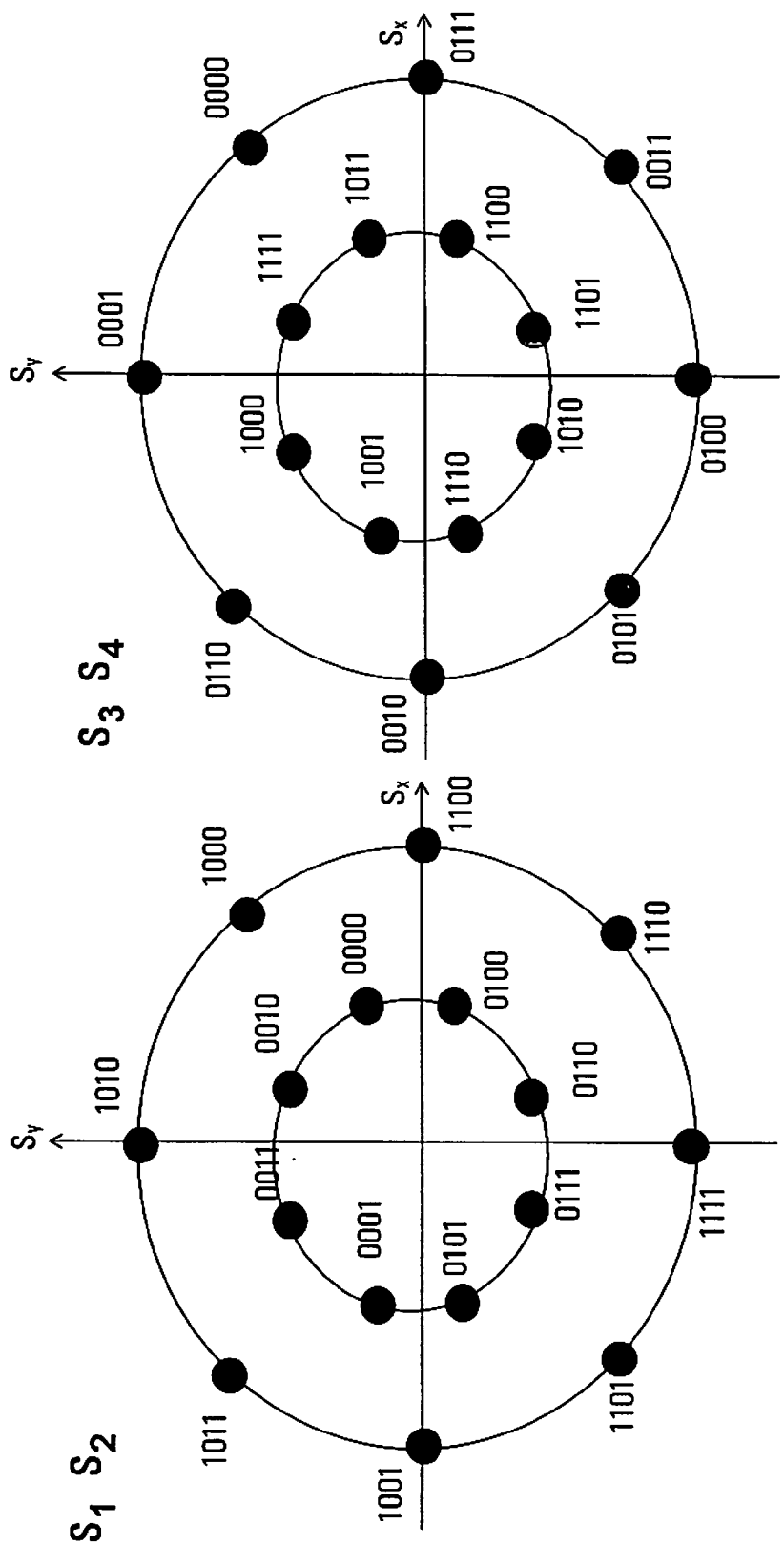
FIG. 8 is a graphical representation of a pre-coding 8 PSK two layer constellation mapping according to another embodiment of the invention.

FIG. 8 shows an example of pre-coding mapping constellations for a rate=1, four transmit antenna in which a first mapping constellation is used for generating $s_1$ and $s_1$ and a second mapping constellation is used for generating $s_3$ and $s_4$. In another embodiment of the invention, the mapping constellations of FIG. 8 could be used in the mapping constellation component 510 of the transmitter of FIG. 5 instead of the napping constellations of FIG. 4. In the embodiment for FIG. 8 the radius of the outer layer is 1.3 and the radius of the inner layer is 0.55. In some embodiments, the radii of the outer and the inner layers may vary, but the ratio of the outer layer to the inner layer is maintained at 1.3:0.55.

Three Antenna Codes

Methods and systems are provided in which each antenna of a MIMO transmitter with an odd numbers of transmit antennas has equal opportunity to transmit signals. In some embodiments of the invention full spatial diversity is achieved within a transmitted code block. In some embodiments of the invention transmission power of the multiple antennas is balanced.

In known MIMO transmitters with an odd number of transmit antennas, one of the antennas typically has twice an opportunity to transmit signals than the other two antennas. This results in the transmission power being unbalanced within the transmitted code block. Therefore, only partial space diversity is achieved due to overweighting of the transmit antenna having twice the opportunity to transmit signals.

Embodiments of the invention presented for the four transmit antenna case can be modified to the case of three transmit antennas by applying an Alamouti construction to the first two antennas, time multiplexed with the third antenna resulting in a block diagonal code matrix with 2×2 and 1×1 matrices as the diagonal elements.

Let us refer to the two signals obtained by the Alamouti construction over the first two antennas as S1 and S2 and the signal transmitted over the third antenna as S3, Note that S1 and S2 have a diversity order of two and can be easily decoded using the orthogonality of the Alamouti structure. The final code is constructed by using a rotated constellation, similar to that of FIG. 6, over S1 and one dimension of S3 (a 3 dimensional constellation with diversity order 3) and a second similar constellation over S2 and the second dimension of S3. The two 3-dimensional constellations are encoded/decoded separately. The rotation angle in optimized for the best performance with low decoding complexity.

Rate=1, Three Transmit Antenna Pre-Coding

In some embodiments of the invention, a rate=1, three transmit antenna pre-coding operation is provided in which an M-ary QAM constellation is used for the pre-coding. For example, for high data rates, 64 QAM is suggested, however similar pre-coding operations can be applied for QAM with different number of symbols.

Figure 9:
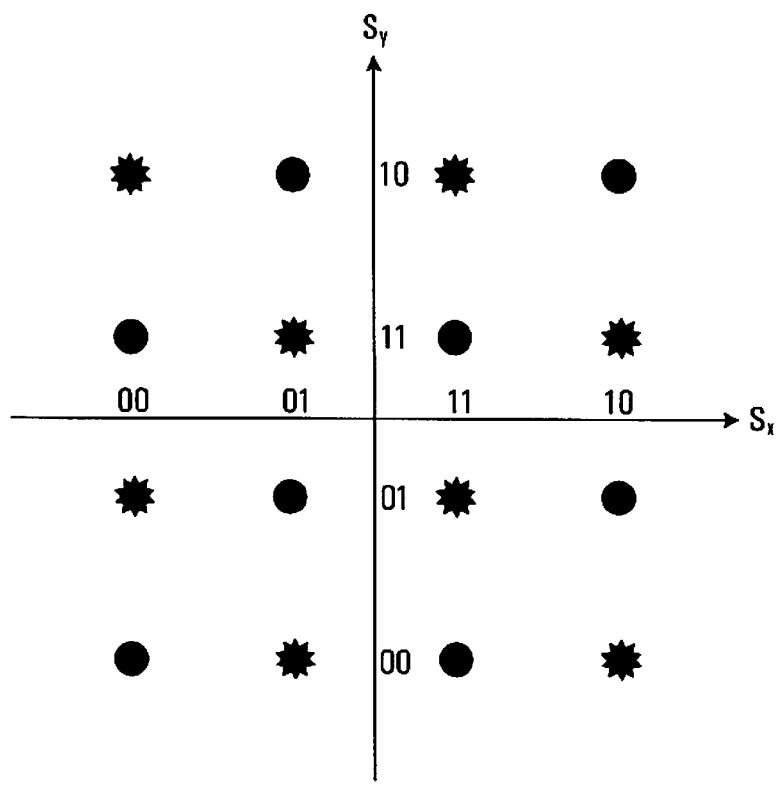
FIG. 9 is a graphical representation of a pre-coding 16 QAM constellation mapping according to another embodiment of the invention.

In the case of M-ary QAM, half of the constellation symbols have even parity and half have odd parity. FIG. 9 shows an example of a 16 QAM constellation, in which symbols designated with a circle have even parity and symbols designated with a star have odd parity.

An example of a method for pre-coding and transmitting symbols for a rate=1 code with three transmit antennas and using a 64 QAM constellation mapping for the pre-coding operation involves 1) adding one parity bit (e.g. even-parity) to 17 bits of data, 2) determining three transmit symbols z1, z2 and z3 from the 64 QAM constellation using the total of 18 bits of coded data, and 3) encoding the transmit symbols with a STBC code, such as $$\begin{bmatrix} z_1 & -z_2^* & -z_3^* & 0 \\ z_2 & z_1^* & 0 & z_3^* \\ z_3 & 0 & z_1^* & -z_2^* \end{bmatrix},$$

where each transmit symbol appears an equal number of times, and antennas are equally utilized. The above STBC code is only one example of an STBC code that could be used, other STBC codes are possible.

More generally, a method for pre-coding and transmitting symbols with three transmit antennas and using an $2^M$ QAM constellation mapping for the pre-coding operation involves 1) adding one parity bit to 3M-1 bits of data, 2) determining three transmit symbols z1, z2 and z3 from the $2^M$ QAM constellation using the total of 3M bits of coded data, and 3) encoding the transmit symbols with a STBC code It is to be understood that even though the above example describes space-time block codes, embodiments of the invention also include apace-frequency block codes.

Rate-1, 3-Transmit Antenna Pre-Coding Decoding

An embodiment of the invention provides for decoding a received signal encoded with the above described pre-coding operation. A first step of decoding the space-time code is:

$$\hat{z} = \begin{bmatrix} \hat{z}_1 \\ \hat{z}_2 \\ \hat{z}_3 \end{bmatrix} = \frac{1}{|h_1|^2 + |h_2|^2 + |h_3|^2} \times \hat{H} \times \begin{bmatrix} y_1 \\ y_2^* \\ y_3^* \\ y_4^* \end{bmatrix}$$

where, $h_i$, i=1 to 3 are channel parameters for each respective transmit antenna channel, $$\hat{H} = \begin{bmatrix} h_1^* & h_2 & h_3 & 0 \\ h_2^* & -h_1 & 0 & -h_3 \\ h_3^* & 0 & -h_1 & h_2 \end{bmatrix} \text{ is}$$

a channel parameter matrix corresponding to the STBC code above, and $y_i$, i=1 to 4 represent the originally transmitted symbols.

A second step is, for each complex value $\hat{z}_i$, determining the closest point $z_i^o$ among constellation symbols with odd parity and the closest point $z_i^0$ among constellation symbols with even parity.

A third step is selecting the bent choice in terms of minimum distance from $\hat{z}$ among the following options:

Choice one: $[z_1^c \ z_2^e \ z_3^e]$;
Choice two: $[z_1^e \ z_2^o \ z_3^o]$;
Choice three: $[z_1^o \ z_2^e \ z_3^o]$;
Choice four: $[z_1^o \ z_2^o \ z_3^e]$.

The second and third steps can be simplified by using a Wagner Rule Decoding method. For instance, in the second step for i=1, 2, 3, determine $\tilde{z}_1$, the closet points from constellation points to $\hat{z}_1$. If the total parity of the labels for $\tilde{z}_1, \tilde{z}_2,$ and $\tilde{z}_3$, Satisfies the even parity condition, the decoding is complete, else go to the third step. In the third step, by replacing one of the symbols $\tilde{z}_i$, i=1, 2, 3 with a symbol from a complementary subset of constellation symbols which has different parity, the parity condition will be satisfied. To do that, a less reliable symbol is determined from $\tilde{z}_i$, i=1, 2, 3 and replaced with the closest symbol from the complementary subset of constellation symbols.

Space Time Code Mapping for Three Antenna Transmitter

Tables 3 to 5 provide an example of a rate=1 STBC code for three transmit antenna transmission. Generally, in the examples, there is one layer of transmission, since on average, one symbol is transmitted per sub-carrier per time instance.

TABLE 3

Code Set-1, Sub-carrier k + 0, Rate = 1, 3 Transmit Antennas

|  | Time t | Time (t + T) |
|---|---|---|
| Antenna 1 | $S_1$ | $-(s_2)^*$ |
| Antenna 2 | $S_2$ | $(s_1)^*$ |

TABLE 4

Code Set-2, Sub-carrier k + 1, Rate = 1, 3 Transmit Antennas

|  | Time t | Time (t + T) |
|---|---|---|
| Antenna 2 | $S_3$ | $-(s_4)^*$ |
| Antenna 3 | $S_4$ | $(s_3)^*$ |

TABLE 5

Code Set-3, Sub-carrier k + 2, Rate = 1, 3 Transmit Antennas

|  | Time t | Time (t + T) |
|---|---|---|
| Antenna 1 | $S_6$ | $-(s_5)^*$ |
| Antenna 3 | $S_5$ | $(s_6)^*$ |

Tables 6 to 8 provide an example of a rate=2 STBC code for three transmit antenna transmission. This is a two layer example in which orthogonal STTD encoding is used for one layer (for example $S_1$ and $S_2$ in Code Set-1, $S_5$ and $S_6$ in Code Set-2, and $S_9$ and $S_{10}$ in Code Set-3) and no such code is used for the other layer ($S_3$ and $S_4$ in Code Set-1, $S_7$ and $S_8$ in Code Set-2, and $S_{11}$ and $S_{12}$ in Code Set-3), symbols in this layer making non-orthogonal contributions.

TABLE 6

Code Set-1, Sub-carrier k + 0, Rate = 2, 3 Transmit Antennas

|  | Time t | Time (t + T) |
|---|---|---|
| Antenna 1 | $S_1$ | $-(s_2)^*$ |
| Antenna 2 | $S_2$ | $(s_1)^*$ |
| Antenna 3 | $S_3$ | $(s_4)^*$ |

TABLE 7

Code Set-2, Sub-carrier k + 1, Rate = 2, 3 Transmit Antennas

|  | Time t | Time (t + T) |
|---|---|---|
| Antenna 1 | $S_7$ | $(s_8)^*$ |
| Antenna 2 | $S_5$ | $-(s_6)^*$ |
| Antenna 3 | $S_6$ | $(s_5)^*$ |

TABLE 8

Code Set-3, Sub-carrier k + 2, Rate = 2, 3 Transmit Antennas

| | Time t | Time (t + T) |
|---|---|---|
| Antenna 1 | $s_{10}$ | $(s_9)^*$ |
| Antenna 2 | $s_{11}$ | $(s_{12})^*$ |
| Antenna 3 | $s_9$ | $-(s_{10})^*$ |

Additional diversity is provided by having three different code sets.

In the examples above there are three different code sets. More generally, the number of code sets is limited by the number of different possible antenna combinations for transmitting symbols.

Tables 3 to 5 are examples for three transmit antennae, more generally however, a method for transmitting a rate=1 space-time block code for a 2 n+1 antenna transmitter where n>=1, the method comprising transmitting at least one code set by: for each pair of consecutive transmission intervals: on each OFDM sub-carrier of a plurality of OFDM sub-carriers, transmitting a respective Alamouti code block containing two transmit symbols on a respective pair of antennas such that all sub-carriers are used and only one pair of antennas is active during a given pair of consecutive transmission intervals for a given subs carrier. Similarly, for Tables 6-8, a method for transmitting a rate=2 space-time block code for a three antenna transmitter, the method comprising transmitting at least one code set by; for each pair of transmission intervals: on each OFDM sub-carrier of a plurality of OFDM sub-carriers, transmitting one code set containing four transmit symbols on the three antennas such that all sub-carriers are used and all three antennae are active during a given pair of transmission intervals for a given sub-carrier.

In some embodiments, the active antennas of a given sub-carrier alternate every pair of consecutive transmission intervals.

Figure 10:
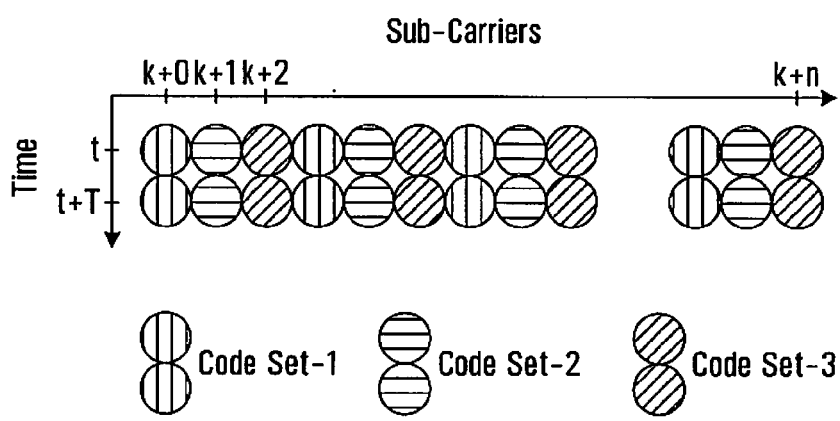
FIG. 10 is an example of a space-time code set sub-carrier mapping pattern for three transmit antennas according to an embodiment of the invention.

A space time code sub-carrier mapping for three transmit antennas will now be described with respect to FIG. 10. This example demonstrates how three code sets can be transmitted, such as those of Tables 3-5. In FIG. 10, Code Set-1, Code Set-2, and Code Set-3 are each comprised of two transmit symbols, where a first transmit symbol is transmitted at a first time interval t and a second transmit symbol is transmitted at a second time interval t+T. Code Set-1 is transmitted on a first sub-carrier k+0, Code Set-2 is transmitted on a second sub-carrier k+1, and Code Set-3 is transmitted on a third sub-carrier k+2. The code sets can be transmitted on multiple available sub-carriers in a sub-carrier band allocated for sub-carrier transmission. The code sets can be transmitted at subsequent periods in time with the same sub-carrier allocation or the respective code sets may be allocated to different sub-carriers.

While the examples of the code sets above are coded in the time direction in adjacent time intervals on different sub-carriers, it is to be understood that the code sets could be coded in the frequency direction in sub-carriers, adjacent or not, in different time intervals.

Code Set Selection

In some embodiments of the invention, a code set includes an orthogonal STTD layer and a non-orthogonal layer as described with respect to Table 6-8 above. Within the orthogonal STTD layer no inter-symbol interference exists. However, interference may exist between the symbols of the orthogonal STTD layer and the symbols of the non-orthogonal layer. If a channel of an uncoded layer is correlated with the channel of a coded layer, system performance degrades.

In some embodiments, for a closed loop system including a base station and at least one wireless terminal, two of the most correlated channels are used for STTD transmission to reduce the possibility of a channel of an uncoded layer being correlated with the channel of the orthogonal STTD coded layer. The wireless terminal feeds back a selection of two antennas to be used for the STTD layer. For example, a particular one of the code sets of Tables 6-8 can be selected for a set of sub-carriers of a given user. In other embodiments, for an open loop system including a base station and at least one wireless terminal, all three code sets are used on different sub-carriers to introduce additional diversity gain into the system.

Decoding Method for Rate=2, STTD with 3 Transmit Antennas

In some embodiments of the invention a zero-forcing (ZF) algorithm is used for rate=2 STTD decoding, for example decoding the code sets of Tables 6 to 8.

Since one layer is STTD encoded, the performance of the ZF algorithm is closer to the performance of a maximum likelihood (ML) algorithm than the performance of the ZF algorithm as compared to the performance of the ML algorithm in the case of BLAST. In some embodiments, soft demapping is weighted in a similar way as in the case of BLAST. In some embodiments, the weighting factors, such as in the case of SNR based weighting, for STTD coded symbols are the same.

The following equation illustrates a matrix representation of a received signal for an example STTD encoded rate=2 code, for example Code Set-1 of Table 6. The received signal can be represented in a matrix format as being equal to the channel characteristic Matrix multiplied by the originally transmitted symbols plus noise:

$$\begin{bmatrix} r_{1,1} \\ r_{1,2} \\ r_{2,1}^* \\ r_{2,2}^* \end{bmatrix} = \begin{bmatrix} h_{11} & h_{12} & h_{13} & 0 \\ h_{21} & h_{22} & h_{23} & 0 \\ h_{12}^* & -h_{11}^* & 0 & h_{13}^* \\ h_{22}^* & -h_{21}^* & 0 & h_{23}^* \end{bmatrix} \begin{bmatrix} s_1 \\ s_2 \\ s_3 \\ s_4 \end{bmatrix} + \begin{bmatrix} n_1 \\ n_2 \\ n_3^* \\ n_4^* \end{bmatrix}$$

The channel characteristic matrix defines the various channel characteristics between transmitter antennas and receiver antennas, which in this case specifically is two receiver antennas and three transmit antennas A decoder for a rate=2 STTD code, for example Code Set-1 in Table 6, generates an estimate of the original transmitted symbols by multiplying the received signal by an inverse of the channel matrix as shown in the following equation:

$$\begin{bmatrix} \tilde{s}_1 \\ \tilde{s}_2 \\ \tilde{s}_3 \\ \tilde{s}_4 \end{bmatrix} = \begin{bmatrix} h_{11} & h_{12} & h_{13} & 0 \\ h_{21} & h_{22} & h_{23} & 0 \\ h_{12}^* & -h_{11}^* & 0 & h_{13}^* \\ h_{22}^* & -h_{21}^* & 0 & h_{23}^* \end{bmatrix}^{-1} \begin{bmatrix} r_{1,1} \\ r_{1,2} \\ r_{2,1}^* \\ r_{2,2}^* \end{bmatrix}$$

similar decoding methods are performed for Code Set-2 and Code Set-3 to decode all originally encoded information symbols.

The complexity of a matrix inversion operation for a rate=2, three transmit antenna code is about 33% of that for a rate=2, four transmit antenna code. Since the complexity of the ZF decoder is dominated by its matrix inversion operation, the decoding complexity of a rate=2, three transmit antenna code is about 50% of the decoding complexity of a rate=2. four transmit antenna code.

Pilot Pattern for Three Transmit Antenna Transmission

For pilot-assisted channel estimation, known pilot Symbols are multiplexed into the data stream at certain sub-channels (sub-carriers) and certain times. The receiver interpolates the channel information derived from the pilot symbols and obtains the channel estimates for the data symbols, and can thereby generate the R matrices referred to above.

Figure 11:
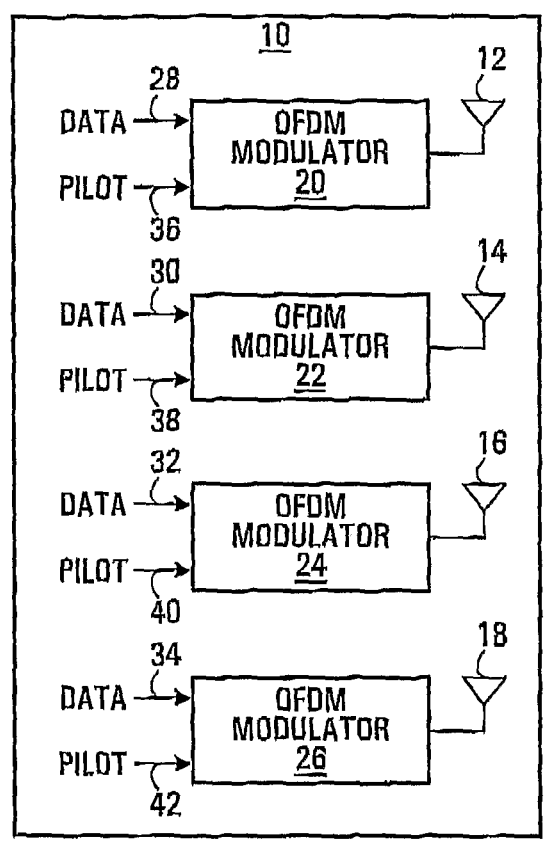
FIG. 11 is a block diagram of a tour antenna OFDM transmitter in which data and pilot are modulated onto each OFDM signal.

A system block diagram is shown in FIG. 11. A MIMO transmitter 10 is shown having four transmit antennas 12,14, 16,18, For each transmit antenna, there is a respective OFDM modulator 20,22,24,26. The OFDM modulators 20,22,24,26 have respective data inputs 28,30,32,34 and pilot inputs 36,38,40,42. It is noted that while one OFDM modulator is shown per antenna, some efficiencies may be realized in combining these functions. Alternatively, since the pilot channel inputs are predetermined, this can be determined within the OFDM modulators per se. Furthermore, while separate data inputs 28,30,32,34 are shown, these may be used to transmit data from one or more sources. Encoding may or may not be performed. Details of the OFDM modulators are not shown. It is well understood that with OFMD modulation, the data and the pilot channel symbols are mapped to sub-carriers of an OFDM signal. In order to generate a particular pilot design, this involves controlling the timing of when data symbols versus pilot symbols are applied to particular sub-carriers and for particular OFDM symbol durations.

FIGS. 12 through 23 are examples of pilot designs provided by various embodiments of the invention. In all of these drawings, time is shown on the vertical axis and frequency is shown on the horizontal axis. The small circles each represent the content of a particular sub-carrier transmitted at a particular time. A row of such circles represents the sub-carriers of a single OFDM symbol. A vertical column of any of these drawings represents the contents transmitted on a given OFDM sub-carrier over time. All of the examples show a finite number of sub-carriers in the frequency direction. It is to be understood that the number of sub-carriers in an OFDM symbol is a design parameter and that the drawings are to be considered to give only one example of a particular size of OFDM symbol.

FIG. 12 to FIG. 16 show examples of DL pilot patterns for three transmit antennas with a FUSC (fully used sub-channelization) permutation. FUSC is a distributed sub-carrier allocation. In the FUSC permutation, all sub-channels are used and full-channel diversity is employed by distributing the allocated sub-carriers to sub-channels using a particular permutation or arrangement.

Figure 12:
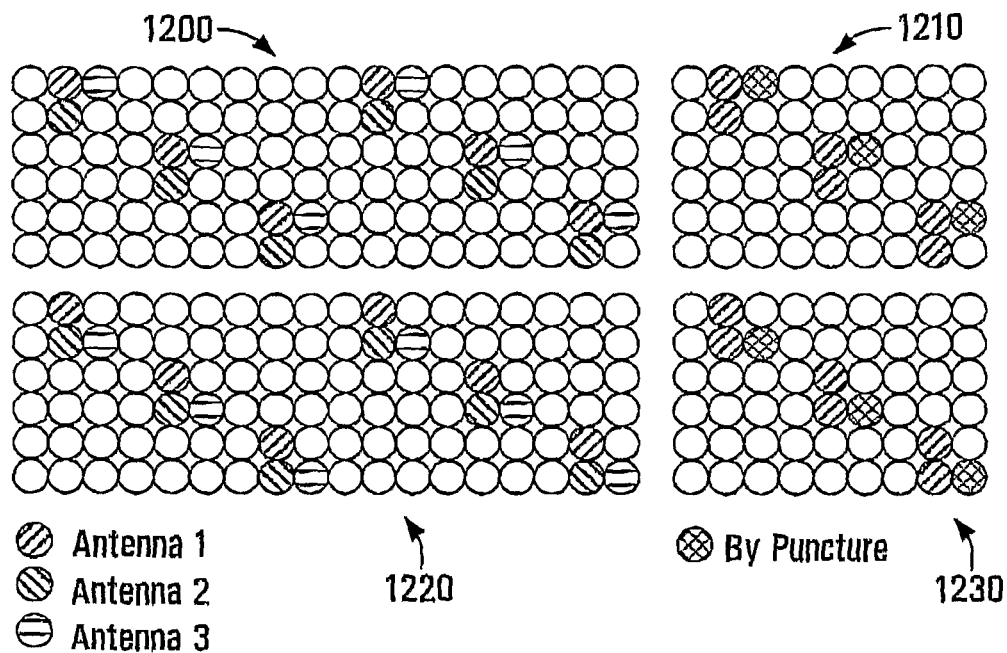
FIG. 12 is a downlink (DL) pilot pattern for a three transmit antenna FUSC (fully used sub-channelization) permutation according to an embodiment of the invention.
Figure 13:
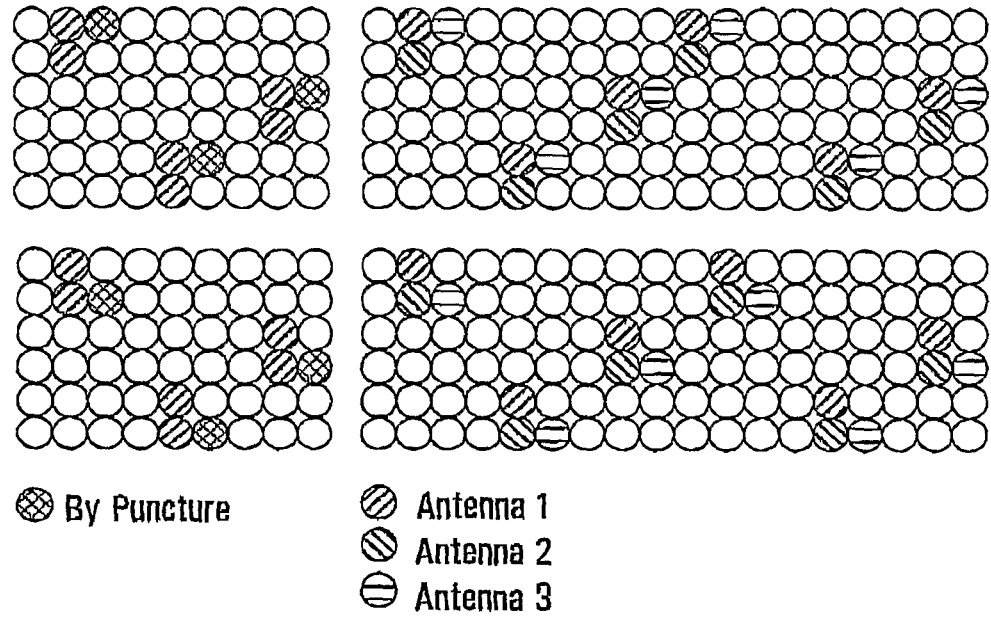
FIG. 13 is a DL pilot pattern for a three transmit antenna FUSC permutation according to another embodiment of the invention.
Figure 14:
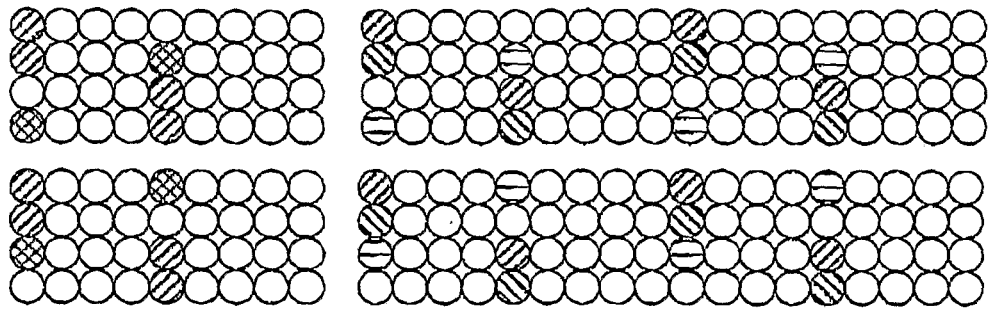
FIG. 14 is a DL pilot pattern for a three transmit antenna FUSC permutation according to another embodiment of the invention.
Figure 15:
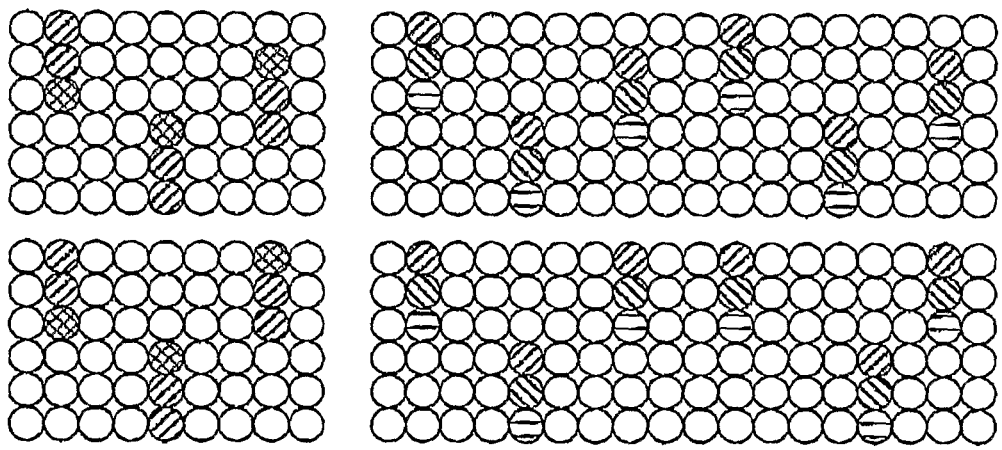
FIG. 15 is a DL pilot pattern for a three transmit antenna FUSC permutation according to another embodiment of the invention.
Figure 16:
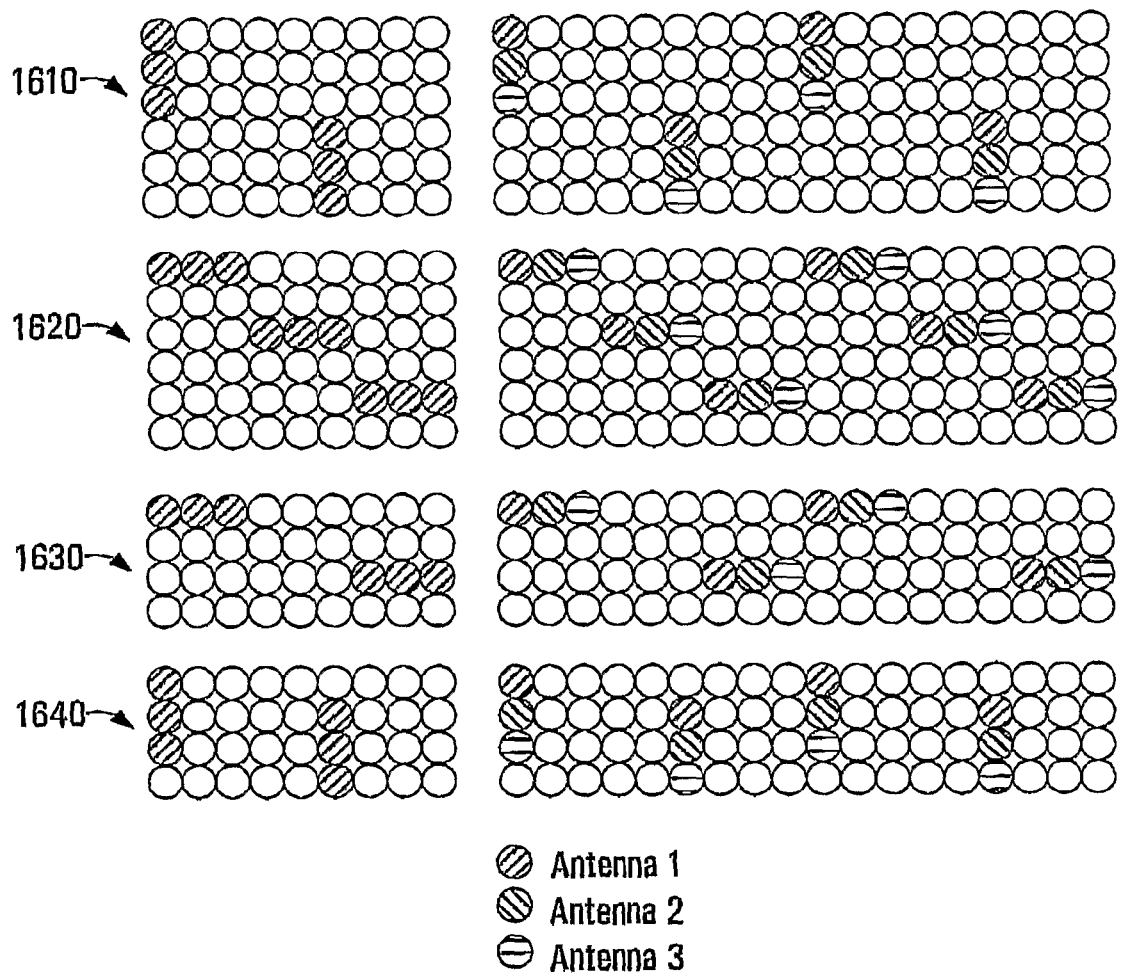
FIG. 16 is a DL pilot pattern for a three transmit antenna FUSC permutation according to another embodiment of the invention.

In FIG. 12, a first block of OFDM symbols on 18 sub-carriers, generally indicated at 1200, contains pilot and data symbols. The pilots are represented by the cross hatched pattern identifying Antenna 1, Antenna 2 and Antenna 3. Block 1200 represents a pilot pattern used by the base station when transmitting to a wireless terminal capable of receiving signals from all three antennas. In the example of block 1200, pilots for a first antenna are located at a first time interval of a second sub-carrier, a third time interval of a fifth sub-carrier, and a fifth time interval of an eighth sub-carrier, pilots for a second antenna are located at a second time interval of the second sub-carrier, a fourth time interval of the fifth sub-carrier, and a sixth time interval of the eighth sub-carrier, pilots for a third antenna are a first time interval of a third sub-carrier, a third time interval of a sixth sub-carrier, and a fifth time interval of a ninth sub-carrier.

A second block of OFDM symbols on nine sub-carriers, generally indicated at 1210, contains pilot and data symbols. The pilots are represented by the cross hatched pattern identifying Antenna 1. Block 1210 represents a pilot pattern sent by the base station with three antennas for receipt by a wireless terminal that is only capable of receiving a signal from a single antenna of the three antenna transmitter. As the wireless terminal is only capable of receiving the signal from one antenna, two pilots are transmitted from the base station to the wireless terminal for the one antenna. The third pilot typically used when all three antennae are transmitting is not sent as a pilot to the wireless terminal as the base station removes it by puncture. Pilots in block 1210 are located at the first pair of time intervals of the second sub-carrier, the third and fourth time intervals of the fifth sub-carrier, and the fifth and sixth time intervals of the eighth sub-carrier. The punctured pilots in close proximity to each of the above described pairs are located at the first time interval of the third sub-carrier, the third time intervals of the sixth sub-carrier, and the fifth time intervals of the ninth sub-carrier.

Blocks 1220 and 1230 in FIG. 12 illustrate another set of pilot patterns similar to 1200 and 1210, respectively, with different pilot locations.

FIGS. 13, 14, 15 and 16 show similar pilot patterns used by base stations for transmitting to wireless terminals capable of receiving from all three transmit antennas or from only one of the three antennas. In the example shown in FIG. 16, blocks 1610, 1620, 1630, and 1640 use all three pilot OFDM symbols for one antenna, instead of puncturing one of the OFDM symbols as in FIGS. 12 to 15.

Figure 17:
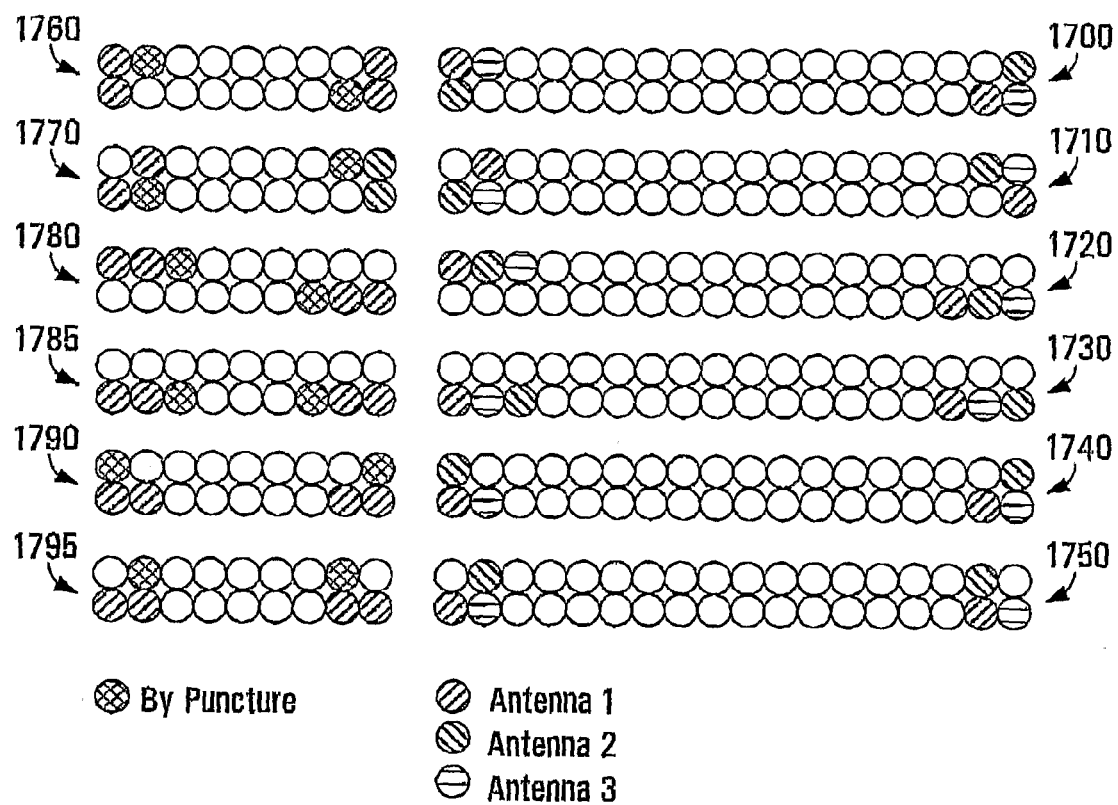
FIG. 17 is a DL pilot pattern for a three transmit antenna PUSC (partially used sub-channelization) permutation according to another embodiment of the invention.

FIG. 17 shows examples of DL (downlink) pilot patterns for three transmit antennas with a PUSC (partial usage sub-carrier) Permutation. In the PUSC permutation, sub-channels are divided into multiple portions that may then be allocated to different users. As with FUSS above, PUSC employs full-channel diversity by distributing the allocated sub-carriers to sub-channels using a particular permutation or arrangement. Blocks 1700, 1710, 1720, 1730, 1740, and 1750 are pilots patterns transmitted by the base station for three antenna receive capable wireless terminals and blocks 1760, 1770, 1780, 1785, 1790, and 1795 are pilot patterns transmitted by the base station for single antenna receive capable wireless terminals. Some of the pilot patterns are shown to have nine nub-carriers and some are shown to have 18 over two time intervals. More generally, the number of sub-carriers and time intervals is implementation dependent.

Similarly to DL, uplink (UL) signaling between a base station and wireless terminal involves the transmission of pilots and data. FIGS. 18 to 23 show examples of UL pilot patterns in an UL tile format for transmission to a base station having three transmit antennas.

Figure 18:
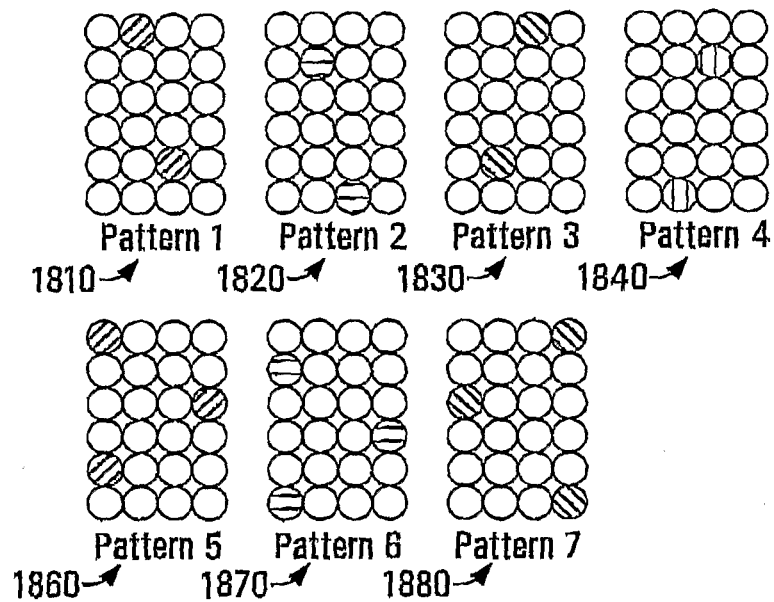
FIG. 18 is a pilot pattern for three transmit antennas in an uplink (UL) STC (space time code) tile format according to an embodiment of the invention.
Figure 19:
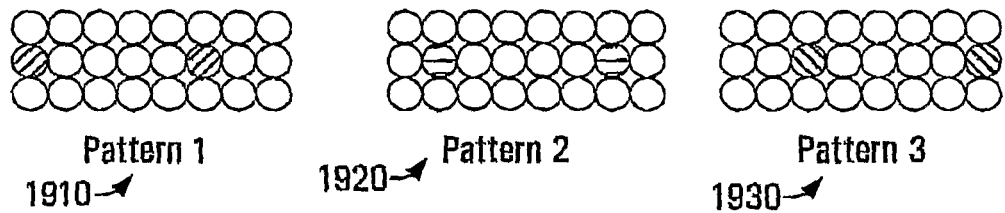
FIG. 19 is a pilot pattern for three transmit antennas in an UL STC tile format according to another embodiment of the invention.

FIGS. 18 and 19 show examples of UL pilot patterns in UL Tiles for STC. Blocks 1810, 1820, 1830, 1840, 1860, 1170 and 1880 show pilot patterns that can be transmitted by wireless terminals to the base station. The patterns in FIG. 18 show tiles with six OFDM symbols on four sub-carriers and the patterns in FIG. 19 show tiles with three OFDM symbols on eight sub-carriers. The positions of the pilots in the pilot patterns ensure that no interference occurs between pilots transmitted from different wireless terminals. However, more generally, the number of sub-carriers is implementation dependent.

In some cases OFDM supports multiple sub-carrier allocation zones with a transmission frame. These zones enable the ability for a communication system to incorporate multiple mobile terminals such that different sub-carrier allocation zones are allocated for different mobile terminals as desired.

Figure 20:
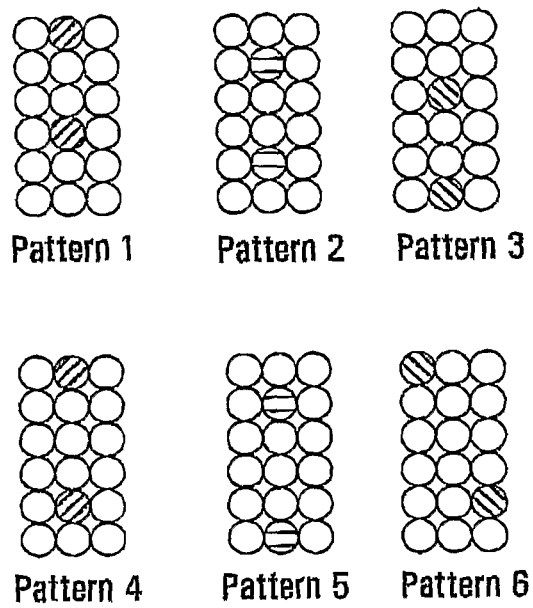
FIG. 20 is a pilot pattern for three transmit antennas in an UL tile format for optional PUSC zones according to an embodiment of the invention.
Figure 21:
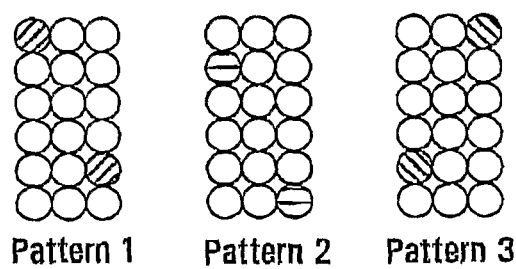
FIG. 21 is a pilot pattern for three transmit antennas in an UL tile format for optional PUSC zones according to another embodiment of the invention.

FIGS. 20 and 21 show examples of UL pilot patterns for transmission to three transmit antennas in a UL Tile for the Optional PUSC Zones.

Figure 22:
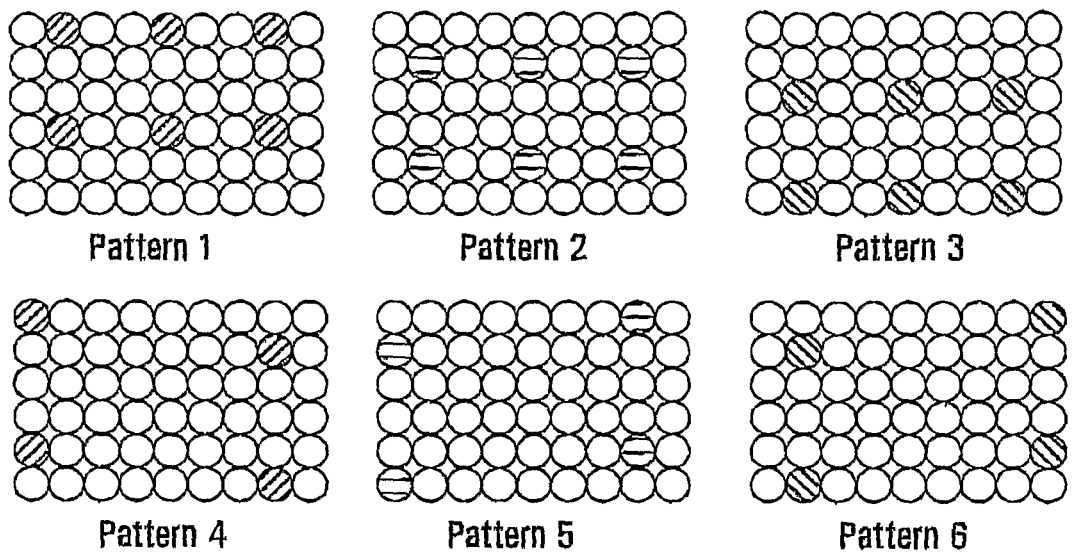
FIG. 22 is a pilot pattern for three transmit antennas in an TL tile format for optional AMC (adaptive modulation and coding) zones according to an embodiment of the invention.
Figure 23:
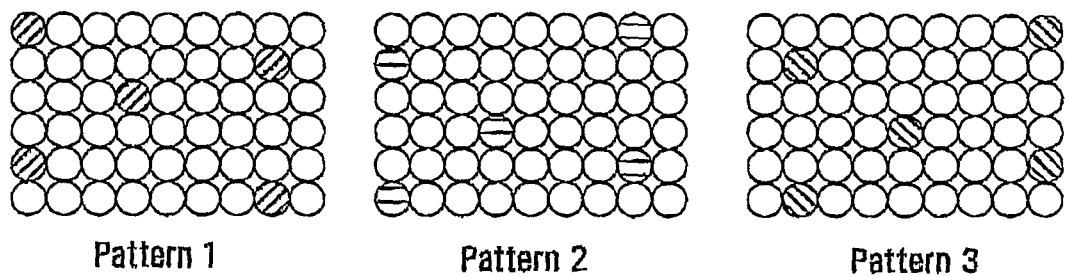
FIG. 23 is a pilot pattern for a three transmit antenna in an UL tile format for optional AMC zones according to another embodiment of the invention.

FIGS. 22 and 23 show examples of UL pilot patterns for transmission to three transmit antennas in a UL Tile for the Optional AMC (adaptive modulation and coding) Zones. AMC uses adjacent sub-carriers to forum sub-channels.

The number of sub-carriers and OFDM symbols in the pilot patterns of FIGS. 12 to 23 are only examples and it is to be understood that more generally the numbers of sub-carriers and OFDM symbols are implementation specific.

Space Time Codes with Dynamic Space Time/Frequency Redundancy

There are various sets of known fixed rate codes that can be used for space time coding of transmissions with multiple transmit antennas. The known fixed rate codes have different sizes depending on a number of transmit symbols to be transmitted within a code block. A block is referred to generally as a time index with multiple time intervals, however it is to be understood that the block may alternatively be a frequency index with multiple frequencies. One code, identified hereafter as G1, transmits one transmit symbol in one block that is capable of being transmitted on one antenna, for example [$s_1$]. Therefore, for a single antenna one G1 code results in a rate=1 code, for a two transmit antenna, two G1 codes can be transmitted, one on each antenna, which result in a rate=2 code, and for a three transmit antenna three G1 codes can be transmitted, one on each antenna for a rate=3 code. Another code, identified hereafter as G2, transmits two transmit symbols in two blocks that are transmitted on two antennas, for example an Alamouti code such as $$\begin{bmatrix} s_1 & s_2 \\ -s_2^* & s_1^* \end{bmatrix}.$$

Therefore, for a two transmit antenna one G2 code results in a rate=1 code. A further code, identified hereafter as G3, transmits three transmit symbols in two blocks that are transmitted on three antennas, for example $$\begin{bmatrix} s_1 & s_2 & s_3^3 \\ -s_2^* & s_1^* & s_3^* \end{bmatrix}.$$

Therefore, for a three transmit antenna one G3 code results in a rate=3/2 code. For two transmit antennas it is possible to transmit using codes G1 or G2, for three transmit antennas it is possible to transmit using codes G1, G2 and G3, for four transmit antennas it is possible to transmit using codes G1, G2, G3 and G4, and so on.

According to an embodiment of the present invention the codes are combined in both space and time to construct space-time codes which result in a mix of spatial multiplexing and transmit diversity. This provides a layer based dynamic space-time/frequency redundancy. The codes can be used to support users of different needs, such as throughput and reliability.

FIGS. 24A-24H illustrate examples of two transmit antenna codes using the fixed rate codes identified above as G1 and G2. The codes are shown for various block lengths, L=3 to 5, where the block length corresponds to the number of blocks along the vertical axis indicated as a time index. More generally, an described above the vertical axis could represent a frequency index. The antenna index is indicated along the horizontal axis and indicates the number of transmit antenna. In the variable rate code examples of FIGS. 24A-24H the number of antennas is two.

For a block length equal to three, FIG. 24A shows a code with a code rate equal to 4/3, generally indicated at 2410, and includes a single G2 code 2410 in a first portion of the three block space and two G1 codes 2420 in a second portion of three block space.

Another case in which the block length is equal to three is shown in FIG. 245. A different code with a code rate equal to 2, generally indicated at 2430, includes six G1 codes 2420, spread within the entire three block space.

For a block length equal to four, FIG. 24C shows a code with a code rate equal to 1, generally indicated at 2440, and includes two G2 codes 2410, one in a first portion of the three block space and one in a second portion of the three block space.

Another case in which the block length in equal to four is shown in FIG. 24D. A different code with a code rate equal to 3/2, generally indicated at 2450, includes one G2 code 2410 in a first portion of the four block space and four G1 codes 2420 spread within a second portion of the four block space.

Yet: another case in which the block length is equal to four is shown in FIG. 24E. A different code with a code rate equal to 2, generally indicated at 2460, includes eight G1 codes 2420, spread within the entire four block space.

For a block length equal to five, FIG. 24F shows a code with a code rate equal to 6/5, generally indicated at 2470, and includes two G2 codes 2410 in a first portion of the five block space and two G1 codes 2420 in a second portion of the five block space.

Another case in which the block length is equal to five is shown in FIG. 24G. A different code with a code rate equal to 8/5, generally indicated at 2480, includes one G2 code 2410 in a first portion of the four block space and six G1 codes 2420 spread within a second portion of the five block space.

Yet another case in which the block length is equal to five is shown in FIG. 244H. A different code with a code rate equal to 2, generally indicated at 2490, includes ten G1 codes 2420, spread within the entire five block space.

Figures 25A, 25B, 25C, 25D, 25E:
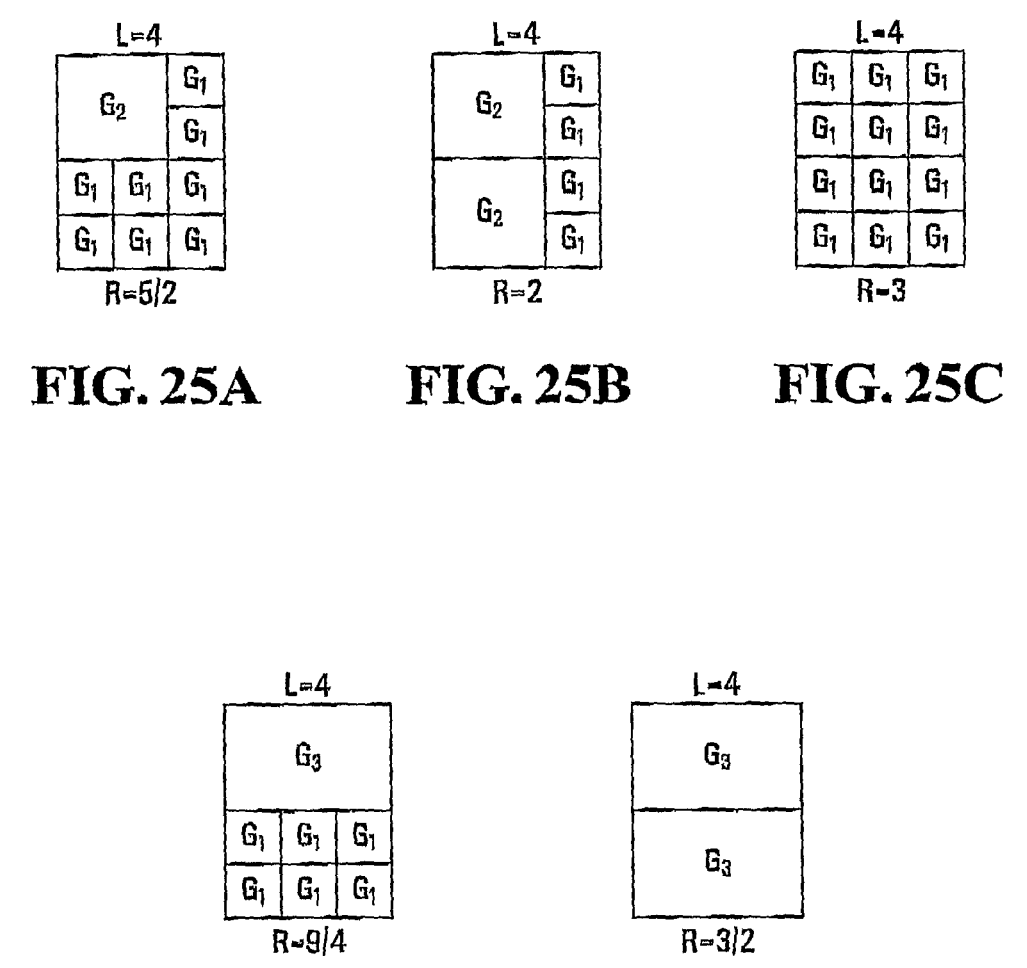

FIGS. 25A-252 illustrate several examples of arrangements of codes identified above as G1, G2 and G3 to be used for three transmit antennas. The code rates for codes in FIGS. 25A-25E are 5/2, 2, 3, 9/4 and 3/2, respectively.

The examples shown in FIGS. 24 and 25 are but a few of the arrangements possible for obtaining particular variable code rate codes. In FIG. 24A, the rate=4/3 code 2400 shown for the block length equal to three has a G2 code 2410 followed by two G1 codes 2420 in the incremented time index direction. An alternative to this may be the two G1 codes 2420 first followed by the G2 code 2410 in the incremented time index direction. Similar rearrangements of other illustrated examples are possible and to be considered within the scope of the invention for the respective space-time/frequency codes.

Table 9 includes a list of code rates for corresponding block lengths in a 2 transmit antenna. The two transmit antenna variable rate STC codes shown in FIGS. 24A-24H are possible arrangements associated with the code rates represented in Table 9 for block lengths (L) equal to 2, 3, 4 and 5.

TABLE 9

2-Transmit-Antenna Code Set and Coding Rate

| Block Length (L) | Code Rates (R) | | | | | | |
|---|---|---|---|---|---|---|---|
| 2  | 1.00 | 2.00 |      |      |      |      |      |
| 3  | 1.33 | 2.00 |      |      |      |      |      |
| 4  | 1.00 | 1.5  | 2.00 |      |      |      |      |
| 5  | 1.20 | 1.6  | 2.00 |      |      |      |      |
| 6  | 1.00 | 1.33 | 1.67 | 2.00 |      |      |      |
| 7  | 1.14 | 1.43 | 1.71 | 2.00 |      |      |      |
| 8  | 1.00 | 1.25 | 1.50 | 1.75 | 2.00 |      |      |
| 9  | 1.11 | 1.33 | 1.56 | 1.78 | 2.00 |      |      |
| 10 | 1.00 | 1.20 | 1.40 | 1.60 | 1.80 | 2.00 |      |
| 11 | 1.09 | 1.27 | 1.45 | 1.64 | 1.82 | 2.00 |      |
| 12 | 1.00 | 1.17 | 1.33 | 1.50 | 1.67 | 1.83 | 2.00 |
| 13 | 1.08 | 1.23 | 1.38 | 1.54 | 1.69 | 1.85 | 2.00 |
| 14 | 1.00 | 1.14 | 1.29 | 1.43 | 1.57 | 1.71 | 1.86 | 2.00 |
| 15 | 1.07 | 1.20 | 1.33 | 1.47 | 1.60 | 1.73 | 1.87 | 2.00 |

Table 9 is an example of resulting code rates for different block lengths in a 2 transmit antenna, other multi transmit antennas have their own respective code rates that could be similarly tabulated for different block lengths.

In some embodiments the codes are used for transmission of symbols on individual sub-carriers. Code Set-1 in Table 6 is an example of the first two blocks of FIG. 25A. The G2 code is represented by $$\begin{bmatrix} s_1 & s_2 \\ -s_2^* & s_1^* \end{bmatrix}$$

and the two G1 codes beside the G2 code are represented by $[s_3]$ and $[s_4^*]$. Additional time intervals t+2t and t+3T would be required in addition to Table 6 to fully represent the additional two blocks containing the remaining six G1 codes.

Numerous modifications and variations of the present invention are possible in light of the above teachings. It is therefore to be understood that within the scope of the appended claims, the invention may be practised otherwise than as specifically described herein.

We claim:

1. A method for transmitting on four antennas comprising:
   pre-coding information bits to generate four transmit symbols;
   encoding two of the transmit symbols into a first Alamouti matrix and encoding another two of the transmit symbols into a second Alamouti matrix;
   transmitting the two Alamouti matrices on four antennas over four time intervals or four frequencies by:
      transmitting the first Alamouti matrix on two antennas during two of the four time intervals or at two of the four frequencies;
      transmitting the second Alamouti matrix on the other two antennas during the other two of the four time intervals or at the other two of the four frequencies;
   wherein the pre-coding and encoding are such that all of the information bits are represented in what is transmitted from each of the four antennas.

2. The method of claim 1, wherein the pre-coding comprises:
   generating the four transmit symbols by mapping M information bits as two sets of M/2 bits, wherein the first set of M/2 bits is mapped on a first and a third $2^{(M/2)}$ QAM mapping constellation to produce first and third transmit symbols, and the second set of M/2 bits is mapped on a second and a fourth $2^{(M/2)}$ QAM mapping constellation to produce second and fourth transmit symbols, wherein M is an integer,
   wherein the first and second transmit symbols are encoded in the first Alamouti matrix and the third and fourth transmit symbols are encoded in the second Alamouti matrix.

3. The method of claim 2 wherein the third and fourth mapping constellations are permuted mappings of the first second and mapping constellations, respectively.

4. The method of claim 2 wherein the second and fourth mapping constellations are the same as the first and third mapping constellations, respectively.

5. The method of claim 2, wherein M=8.

6. The method of claim 1, wherein the pre-coding comprises:
   mapping four pairs of information bits to 4-PSK symbols by mapping each pair of bits on a respective one of four rotated 4-PSK mapping constellations;
   generating transmit symbols by forming combinations of the real and imaginary components of the 4-PSK symbols.

7. The method of claim 6 wherein said forming combinations of the real and imaginary components of the 4-PSK symbols comprises generating the following transmit symbols:
   $s_1 = Re\{C_1\} + jRe\{C_2\}$, $s_2 = Re\{C_3\} + jRe\{C_4\}$, $s_3 = Im\{C_1\} + jIm\{C_2\}$, and
   $s_4 = Im\{C_3\} + jIm\{C_4\}$,
   where $C_1$ is the first rotated 4-PSK mapping constellation, $C_2$ is the second rotated 4-PSK mapping constellation, $C_3$ is the third rotated 4-PSK mapping constellation, and $C_4$ is the fourth rotated 4-PSK mapping constellation.

8. The method of claim 6 wherein each respective one of four rotated 4 PSK mapping constellations is rotated by an angle $\pi/4 - \theta$ where $\theta = \tan^{-1}(1/3)$.

9. The method of claim 6, further comprising using a rotation angle of the rotated 4-PSK mapping constellations to increase a minimum determinant distance of a 4×4 matrix containing the first and second Alamouti matrices.

10. The method of claim 9 wherein the rotation angle is $\pi/4 - \theta$ where $\theta = \frac{1}{2}\tan^{-1}(1/2)$.

11. The method of claim 1, wherein the pre-coding comprises:
   generating four transmit symbols by mapping M information bits as two sets of M/2 bits, wherein the first set of M/2 bits is mapped on one layer of a first two layer $2^{(M/2)}$ PSK mapping constellation and one layer of a second two layer $2^{(M/2)}$ PSK mapping constellation to produce first and third transmit symbols, and the second set of M/2 bits is mapped on the other layer of the first two layer $2^{(M/2)}$ PSK mapping constellation and the other layer of the second two layer $2^{(M/2)}$ PSK mapping constellation to produce second and fourth transmit symbols, wherein M is an integer,
   wherein the first and second transmit symbols are encoded in the first Alamouti matrix and the third and fourth transmit symbols are encoded in the second Alamouti matrix.

12. A four antenna transmitter, comprising:
   four antennas; and
   processing hardware coupled to the at least four antennas, wherein the processing hardware is configured to:
      pre-code information bits to generate four transmit symbols;

encode two of the transmit symbols into a first Alamouti matrix and encode another two of the transmit symbols into a second Alamouti matrix;

transmit the two Alamouti matrices on the four antennas over four time intervals or four frequencies by:
transmitting the first Alamouti matrix on two antennas during two of the four time intervals or at two of the four frequencies;
transmitting the second Alamouti matrix on the other two antennas during the other two of the four time intervals or at the other two of the four frequencies;
wherein the pre-code and encode occur such that all of the information bits are represented in what is transmitted from each of the four antennas.

13. A device for receiving and decoding Alamouti matrices, comprising:
communication circuitry; and
processing hardware coupled to the communication circuitry, wherein the processing hardware is configured to operate with the communication circuitry to:
receive first and second Alamouti matrices from a transmitting device, the transmitting device configured to:
pre-code information to generate four transmit symbols;
encode two of the transmit symbols into the first Alamouti matrix;
encode another two of the transmit symbols into the second Alamouti matrix, wherein the pre-code and encode occur such that all of the information bits are represented in what is transmitted from each of the four antennas;
transmit the first Alamouti matrix using two antennas during two of four time intervals or at two of four frequencies; and
transmit the second Alamouti matrix during the other two of the four time intervals or at the other two of the four frequencies; and
decode the first Alamouti matrix; and
decode the second Alamouti matrix.

14. A method for transmitting on three transmit antennas comprising:
pre-coding information bits to generate transmit symbols;
encoding the generated transmit symbols using a space time/frequency block code in which each transmit symbol appears an equal number of times, in which each of the three transmit antennas is utilized equally, and in which all of the information bits are represented in what is transmitted from each one of the three transmit antennas;
transmitting the space time/frequency block code over the three transmit antennas;
wherein the pre-coding comprises:
mapping four pairs of information bits to 4 PSK symbols by mapping each pair of bits on a respective one of four rotated 4 PSK mapping constellations;
generating transmit symbols by forming combinations of the real and imaginary components of the 4 PSK symbols; and
wherein forming combinations of the real and imaginary components of the 4 PSK symbols comprises:
generating the transmit symbols $s_1 = \text{Re}\{C_1\} + j\text{Re}\{C_2\}$, $s_2 = \text{Re}\{C_3\} + j\text{Re}\{C_4\}$, $s_3 = \text{Im}\{C_1\} + j\text{Im}\{C_2\}$, and $s_4 = \text{Im}\{C_3\} + j\text{Im}\{C_4\}$, wherein $C_1$ is the first rotated 4 PSK mapping constellation, $C_2$ is the second rotated 4 PSK mapping constellation, $C_3$ is the third rotated 4 PSK mapping constellation, and $C_4$ is the fourth rotated 4 PSK mapping constellation.

15. A method for transmitting a rate=1 space-time block code over 2n+1 transmit antennas where n>=1, the method comprising transmitting at least one code set by:
for each pair of consecutive transmission intervals:
on each OFDM sub-carrier of a plurality of OFDM sub-carriers, transmitting a respective Alamouti code block containing two transmit symbols on a respective pair of transmit antennas such that all sub-carriers are used and only one pair of transmit antennas is active during a given pair of consecutive transmission intervals for a given sub-carrier;
wherein there are three transmit antennas, and during the pair of consecutive transmission intervals every third sub-carrier starting at k is active on a first pair of transmit antennas, every third sub-carrier starting at k+1 is active on a second pair of transmit antennas, and every third sub-carrier starting at k+2 is active on a third pair of transmit antennas, where k is an index of a first sub-carrier of the plurality of OFDM sub-carriers.

16. A method for generating a space time/frequency code for a multi-antenna transmitter comprising:
combining various fixed rate space time/frequency codes for a given block length of time intervals or frequencies, at least two of the various fixed rate space time/frequency codes combined each having a fixed rate different from each other, the various fixed rate space time/frequency codes being combined in a manner that the combination utilizes the entire transmission space of the given block length for each transmit antenna of the multi-antenna transmitter resulting in a space time/frequency code rate that is a function of each of the various fixed rate space time/frequency code utilized.

17. The method of claim 16, wherein the at least two of the various fixed space/time frequency codes each having a fixed rate different from each other are selected from a group of fixed rate space time/frequency codes consisting of:
a fixed rate space time/frequency code comprising one symbol in one block that is capable of being transmitted on one antenna;
a fixed rate space time/frequency code comprising two symbols in two blocks that are transmitted on two antennas; and
a fixed rate space time/frequency code comprising three symbols in two blocks that are transmitted on three antennas.

18. A multi-antenna transmitter, comprising
a plurality of antennas; and
processing hardware coupled to the plurality of antennas, wherein the processing hardware is configured to:
combine various fixed rate space time/frequency codes for a given block length of time intervals or frequencies, at least two of the various fixed rate space time/frequency codes combined each having a fixed rate different from each other, the various fixed rate space time/frequency codes being combined in a manner that the combination utilizes the entire transmission space of the given block length for each antenna of the plurality of antennas resulting in a space time/frequency code rate that is a function of each of the various fixed rate space time/frequency codes utilized.

19. A method for transmitting on an even number of transmit antennas comprising:
pre-coding information bits to generate 2N transmit symbols, wherein N is an integer;
encoding each pair of transmit symbols into a respective one of N Alamouti matrices;

transmitting the N Alamouti matrices on 2N antennas over 2N time intervals or 2N frequencies by:

transmitting each Alamouti matrix on two antennas and a respective two of the 2N time intervals or a respective two of the 2N frequencies;

wherein the pre-coding and encoding are such that all of the information bits are represented in what is transmitted from each of the four transmit antennas.

* * * * *